(12) United States Patent
Giroux

(10) Patent No.: US 8,448,971 B2
(45) Date of Patent: May 28, 2013

(54) SEAT ANTI-THEFT ASSEMBLY AND METHOD OF INSTALLING THE SAME

(75) Inventor: Michel Giroux, Jonquiere (CA)

(73) Assignee: Societe de Velo en Libre-Service, Lachine, Quebec (CA)

(*) Notice: Subject to any disclaimer, the term of this patent is extended or adjusted under 35 U.S.C. 154(b) by 251 days.

(21) Appl. No.: 12/995,974

(22) PCT Filed: Jun. 4, 2009

(86) PCT No.: PCT/CA2009/000781
§ 371 (c)(1), (2), (4) Date: Jan. 24, 2011

(87) PCT Pub. No.: WO2009/146549
PCT Pub. Date: Dec. 10, 2009

(65) Prior Publication Data
US 2011/0162417 A1    Jul. 7, 2011

Related U.S. Application Data

(60) Provisional application No. 61/059,421, filed on Jun. 6, 2008.

(51) Int. Cl.
*B62J 1/08* (2006.01)
(52) U.S. Cl.
USPC ............................................. 280/287
(58) Field of Classification Search
USPC ...................... 280/278, 281.1, 287
See application file for complete search history.

(56) References Cited

U.S. PATENT DOCUMENTS 6,158,881 A * 12/2000 Carne .................... 362/473
7,114,738 B1    10/2006 Chen

FOREIGN PATENT DOCUMENTS

| DE | 4336605 A1 * | 5/1995 |
|----|--------------|--------|
| DE | 100 23 978 | 11/2001 |
| DE | 10 2004 009927 | 9/2005 |
| DE | 202007014515 | 2/2008 |
| EP | 0 849 148 | 6/1998 |
| WO | WO 03/004342 | 1/2003 |
| WO | WO 2005/021364 | 3/2005 |
| WO | WO 2006/053976 | 5/2006 |

OTHER PUBLICATIONS

European Search Report for European Application No. EP 09 75 7011 mailed Mar. 29, 2012.
International Search Report for International Application No. PCT/CA2009/000781 mailed Sep. 18, 2009.

* cited by examiner

*Primary Examiner* — Kevin Hurley
(74) *Attorney, Agent, or Firm* — Pearl Cohen Zedek Latzer, LLP

(57) ABSTRACT

There is provided a seat anti-theft assembly for use with a bicycle frame, the seat anti-theft assembly comprising a sleeve having a closed end, an open end and a sleeve chamber extending therebetween, the sleeve being mounted to the bicycle frame; a seat post having a seat end configured for receiving a seat thereon and an opposed engaging end adapted for engaging the sleeve chamber through the open end; a compartment mounted to the bicycle frame, the compartment having therein a compartment cavity in communication with a hollow lower portion of the bicycle frame, the compartment further having an access opening therein sized and shaped to allow access to the compartment cavity; a first stopping member mounted in the sleeve chamber; and a second stopping member associated with the seat post, the second stopping member being configured for cooperating with the first stopping member to allow slidable movement of the seat post along a restricted path of travel.

16 Claims, 14 Drawing Sheets

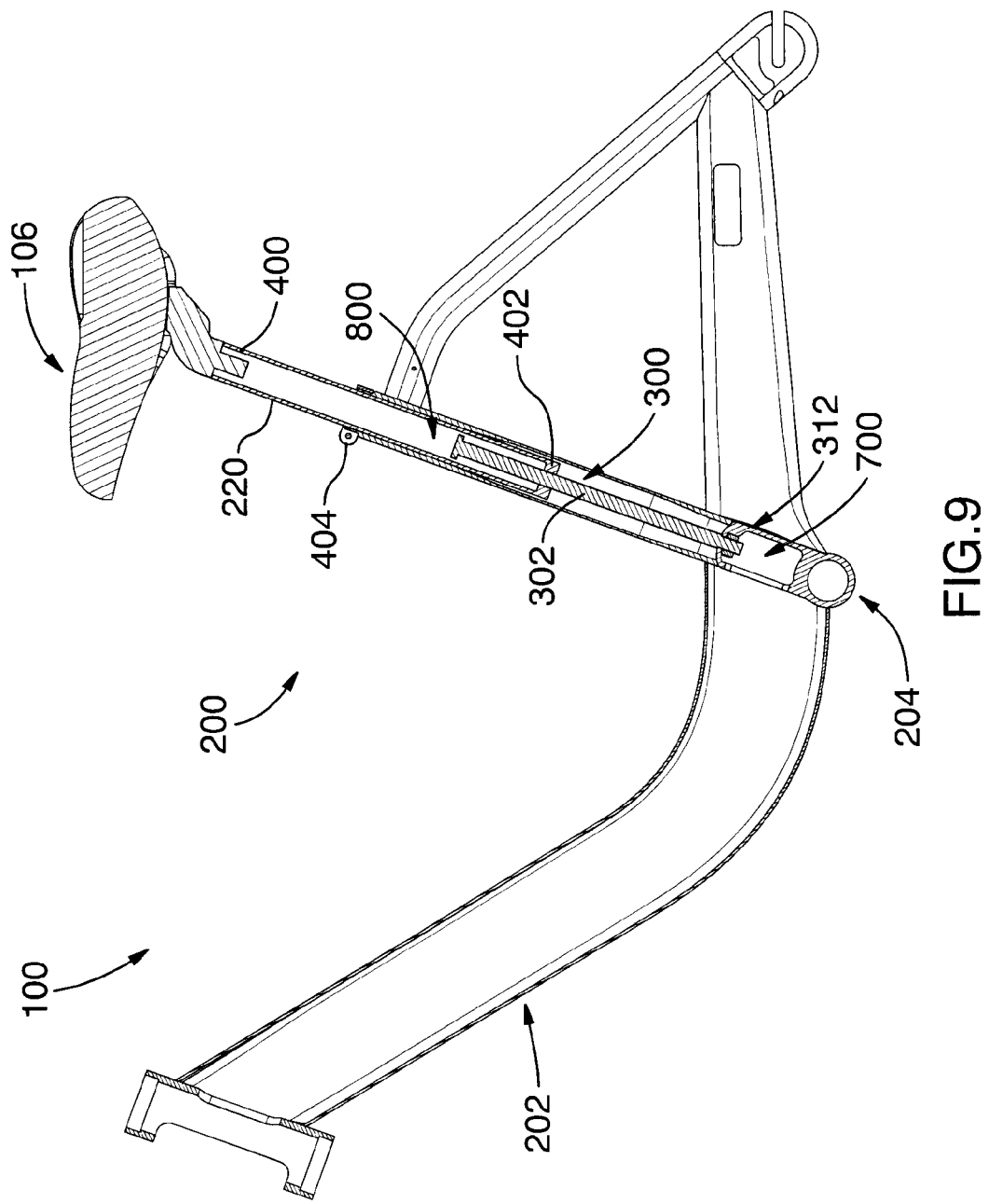

SEAT ANTI-THEFT ASSEMBLY AND METHOD OF INSTALLING THE SAME

CROSS-REFERENCE TO RELATED APPLICATIONS

This application is a National Phase Application of PCT International Application No. PCT/CA2009/000781, entitled "SEAT ANTI-THEFT ASSEMBLY AND METHOD OF INSTALLING THE SAME", International Filing Date Jun. 4, 2009, published on Dec. 10, 2009 as International Publication No. WO 2009/146549, which in turn claims priority from U.S. Provisional Patent Application No. 61/059,421, filed Jun. 6, 2008, both of which are incorporated herein by reference in their entirety.

FIELD OF THE INVENTION

The invention relates to bicycle seats. More precisely, this invention pertains to a seat anti-theft assembly for use with a bicycle frame.

BACKGROUND OF THE INVENTION

Bicycles are one of the most popular means of transportation worldwide. They are easy to use and their maintenance is fairly inexpensive.

In cities, users may take the bicycle at one location and leave it at another location for a given amount of time. For instance, a bicycle user may leave his bicycle on the street or the sidewalk while running an errand in a store.

Unfortunately, when left unattended, especially in places accessible to a large numbers of persons, a bicycle may be subject to vandalism or even theft in the more extreme cases. One of the most frequent vandalism act performed on bicycles is the theft of the seat, also known in the art as saddle.

Generally, a bicycle comprises a seat attached to the upper end of a seat post. The seat post is telescopically inserted in a seat tube forming part of the bicycle frame, the seat tube defining a sleeve in which the seat post is received. To enable users with different body configurations to ride the bicycle, the seat post is slidable inside the seat tube. A user, prior to riding the bicycle, adjusts the height of the seat such that his feet may comfortably reach the bicycle pedals when he is riding the bicycle. Bicycle position selection means, such as a split collar system, are usually provided for selectively fastening and unfastening the seat post in the seat tube at the adjusted height.

In most bicycles, the lower end of the seat post is simply inserted in the upper end of the seat tube. This configuration facilitates the assembly of the seat to the bicycle. Unfortunately, this configuration also facilitates the theft of the bicycle seat. Indeed, by merely unfastening the seat post using the bicycle position selection means, a malevolent individual may raise the seat post in the seat tube until the lower end of the seat post is raised over the upper end of the seat tube, thereby removing the seat and seat post from the bicycle.

One way to avoid such act is for users to remove the seat from the bicycle and put the seat in a secure location, such as on their person, before leaving the bicycle unattended.

According to this solution, the users are faced with the burden of removing the seat from the seat tube of the bicycle and bringing the seat along with them wherever they go without the bicycle.

The skilled addressee will appreciate that this is a major drawback for the user since the user has to carry an item along with him. This situation is most impractical, especially if the user is leaving his bicycle unattended to run some errands.

International application WO2005/021364 by Tribout discloses a seat post locking device in which the height at which the seat post may be raised in the seat tube is limited. This device aims at preventing users from raising the seat over a certain level and running the risk of the lower end of the seat post or the upper end of the seat tube breaking while the user is riding the bicycle.

This device is specifically made to be used with a type of bicycle called full suspension bicycles. Such a bicycle is provided with a rear wheel suspension system located beneath the seat. The seat tube in such a bicycle therefore comprises a tube shorter than seat tubes used on other types of bicycles; in some of those bicycles, the seat tube further comprises an upper open end and a bottom open end.

More precisely, Tribout teaches of a device comprising a rod concentrically inserted in the seat post. This rod is slidably mounted to a fixing element and may slide through a central hole provided thereon. The fixing element is threadably mounted to the inside wall of the seat post. The rod further comprises a bulging head provided at its upper end and a spring wrapped around the upper end of the rod, the spring being caught between the bulging head and the fixing element. The lower end of the rod is fixedly mounted to a ring element comprising an abutting lip designed to abut the lower open end of the seat tube when the seat post is raised above a certain level.

When the seat is in its lowermost position, the lower end of the seat post and the ring element are positioned lower than the lower open end of the seat tube. When the seat is raised, the seat post, and therefore the rod, slides upwardly in the seat tube until the lip of the ring element abuts the lower end of the seat tube. The rod is then immobilized in this position, while the seat post may still slide upwardly. The skilled addressee will appreciate that when the rod is static and the seat post is slid upwardly, the spring is compressed. The seat post may thus be raised until the spring is maximally compressed, thereby preventing the seat post from being completely removed from the seat tube.

This device suffers from many shortcomings. For instance, in bicycles other than full suspension bicycles, the lower end of the seat tube is generally not open. If the device was installed on such a bicycle, it would be impossible for the lip of the ring element to abut the lower end of the seat tube and to limit the upward displacement of the rod.

Another shortcoming is that the installation of such a system requires access to the bottom end of the seat post once it has been inserted in the seat tube for securing the ring element to the bottom end of the rod. In a bicycle other than a full suspension bicycle, the bottom end of the seat post is inaccessible once it has been inserted in the seat tube, making the installation of such a device cumbersome.

Another shortcoming is that, if the lower end of the seat tube in fact comprises an open end, such as in some full suspension bicycles, the bottom end of the seat post will remain accessible to all after the device is installed in the bicycle. This unrestricted access to the bottom end of the seat post is a great disadvantage, since a malicious individual is free to tamper with it in order to remove the seat post from the seat tube and steal the saddle attached to the seat post.

Another shortcoming is that the outer surface of the bottom of the seat post may also be exposed to dirt, rain or any other source of natural damage, which is a great disadvantage as it may hinder the sliding of the seat post in the seat tube.

Another shortcoming is that the height at which the seat may be raised is limited by the characteristics of the spring being caught between the bulging head of the rod and the fixing element. The manufacturer of such system thus has to take into account the length of the maximally compressed spring when designing the seat post, making it longer then actually needed. This results in a great amount of material being wasted, which is not desirable.

Moreover, after the ring element has abutted the lower end of the seat tube, raising the seat post requires a great amount of strength from a user, as the compressed spring exerts a downward force on the seat post. This feature may become an issue and potentially lead to injuries.

There is therefore a need for an apparatus that will overcome at least one of the above-identified drawbacks.

Features of the invention will be apparent from review of the disclosure, drawings and description of the invention below.

BRIEF SUMMARY

There is provided a seat anti-theft assembly for use with a bicycle frame.

According to one aspect, the seat anti-theft assembly comprises a sleeve having a closed end, an open end and a sleeve chamber extending therebetween, the sleeve being mounted to the bicycle frame; a seat post having a seat end configured for receiving a seat thereon and an opposed engaging end adapted for engaging the sleeve chamber through the open end; a compartment mounted to the bicycle frame, the compartment being located adjacent to the closed end of the sleeve, the compartment having therein a compartment cavity in communication with a hollow lower portion of the bicycle frame, the compartment further having an access opening therein sized and shaped to allow access to the compartment cavity; a first stopping member mounted in the sleeve chamber; and a second stopping member associated with the seat post, the second stopping member being configured for cooperating with the first stopping member to allow slidable movement of the seat post along a restricted path of travel.

The skilled addressee will appreciate that the seat anti-theft assembly comprises few parts and is therefore easy to manufacture. This is particularly advantageous when a large number of seat anti-theft assembly are needed, such as to be mounted on bicycles used in a bicycle sharing program, for instance.

The skilled addressee will further appreciate that the sliding of the seat post in the sleeve chamber advantageously requires minimal effort from a user and therefore facilitates adjustment of the height of the seat.

In one embodiment, the first stopping member comprises a rod having a connecting end for connecting the rod to the closed end of the sleeve and a first stopping end located away from the connecting end.

In a further embodiment, the first stopping end comprises a first annular flange having a first flange surface for engaging the first stopping member.

In yet a further embodiment, the first flange surface faces towards the closed end of the sleeve.

In another embodiment, the first flange surface comprises a planar surface.

In yet another embodiment, the first annular flange is threadily mounted to the first stopping end of the rod.

In a further embodiment, the first stopping member comprises a stopping screw and the first annular flange comprises a screw head of the stopping screw, the stopping screw being mounted in a stopping screw receiving hole extending axially and inwardly in the rod from the first stopping end thereof.

In another embodiment, the sleeve chamber has a sleeve chamber longitudinal axis, the rod being fastened to the closed end of the sleeve and extending therefrom towards the open end of the sleeve, the rod extending along the sleeve chamber longitudinal axis.

In yet another embodiment, the seat post comprises a seat post chamber extending between the seat end and the second stopping member, the seat post chamber being sized and shaped to slidably receive therein the rod.

In a further embodiment, the second stopping member comprises a second annular flange having a second flange surface, the second annular flange defining a rod opening for slidably receiving therein the rod.

In yet a further embodiment, the second flange surface faces towards the open end of the sleeve.

In yet a further embodiment, the second flange surface is a planar surface.

In another embodiment, the first flange surface abuttingly engages the second flange surface when the seat post slides away from the closed end of the sleeve so as to stop the seat post.

The skilled addressee will appreciate that if the seat post is pulled forcefully away from the closed end of the sleeve while the first flange surface abuts the second flange surface, the first exerted will be distributed on the first and second flange surfaces abuttingly engaged together. This is of great advantage since it provides the seat anti-theft assembly with great robustness.

In yet another embodiment, the rod is narrower than the first annular flange, the first annular flange being wider than the rod opening.

In yet another embodiment, the second annular flange is threadily mounted to the seat post near the engaging end thereof.

In a further embodiment, the second annular flange comprises a removable punctured cap mountable in the seat post chamber, the removable punctured cap being adapted for threadily cooperating with an internally threaded portion of the seat post chamber.

In one embodiment, the compartment comprises a compartment sidewall defining the closed end of the sleeve, the compartment sidewall being configured for connecting the first stopping member to the compartment.

In a further embodiment, the compartment sidewall includes a sidewall opening adapted to receive the first stopping member therein.

In yet a further embodiment, the rod comprises a fastening portion projecting outwardly from the connecting end, parallel to the rod, the fastening portion being adapted for engaging the sidewall opening.

In yet a further embodiment, the seat anti-theft assembly further comprises fastening means cooperable with the fastening portion for fastening the first stopping member to the closed end of the sleeve.

In yet a further embodiment, the fastening portion is narrower than the rod, thereby defining a shoulder between the rod shaft and the fastening portion for abuttingly engaging the compartment sidewall.

In yet a further embodiment, the compartment sidewall has a given thickness, the fastening portion being longer than the given thickness of the compartment sidewall.

In yet a further embodiment, the fastening portion is engaged in the sidewall opening such that a threaded portion of the fastening portion located away from the shoulder protrudes from the compartment sidewall and into the compartment cavity, the fastening means comprising a nut adapted to threadily engage the threaded portion for holding the compartment sidewall between the nut and the shoulder.

The skilled addressee will appreciate that in such an embodiment, the compartment advantageously enables an operator to access the fastening means to selectively fasten the rod to the closed end of the sleeve and to unfasten the rod from the closed end of the sleeve.

Moreover, still in this embodiment, the skilled addressee will appreciate that an operator may use a tool such as a socket wrench or the like for fastening or unfastening the nut for maintenance of the seat anti-theft assembly. This is of great advantage in a context where a bicycle having a seat anti-theft assembly mounted thereon is used frequently and requires periodical maintenance, such as a bicycle sharing program.

In another embodiment, the compartment comprises a compartment cover removably mounted on the access opening for preventing unwanted access to the compartment cavity.

The skilled addressee will appreciate that in such an embodiment, the compartment cover advantageously prevents a malicious individual from accessing the compartment cavity and stealing of vandalizing elements located therein, such as parts of the seat anti-theft assembly.

Moreover, the skilled addressee will further appreciate that when the cover is mounted on the access opening, the sleeve chamber and seat post are not accessible. This advantageously contributes to preventing water and dust from entering and damaging the seat anti-theft assembly.

In yet another embodiment, the compartment cover is selectively securable on the access opening and unsecurable therefrom using a dedicated cover securing tool.

In a further embodiment, the bicycle frame is part of a bicycle used in a bicycle sharing program, the dedicated cover securing tool being in the possession of an operator of the bicycle sharing program.

In another embodiment, the sleeve chamber defines a sleeve chamber longitudinal axis, the access opening having an access opening axis which is disposed orthogonal to the sleeve chamber longitudinal axis.

In a further embodiment, the bicycle frame comprises a bottom bracket shell adapted for receiving a crankset assembly of a bicycle, the compartment being mounted on the bottom bracket shell.

In yet a further embodiment, the crankset assembly comprises a plate positioned orthogonal to the sleeve chamber longitudinal axis, the plate being selectively securable on the access opening and unsecurable therefrom using a dedicated plate securing tool.

The skilled addressee will appreciate that this is of great advantage, as access to the compartment requires removal of at least part of the crankset assembly from the bicycle, which is cumbersome and requires a great amount of time and proper tools to accomplish.

In yet a further embodiment, the bicycle frame is part of a bicycle used in a bicycle sharing program, the dedicated plate securing tool being in possession of an operator of the bicycle sharing program.

In another embodiment, the seat anti-theft assembly further comprises seat position locking means associated with the sleeve, the seat position locking means being configured for temporarily locking the seat post in a desired position along its restricted path of travel.

In a further embodiment, the seat position locking means comprise a split collar system mounted to the sleeve, the split collar system being adapted to be selectively loosened and tightened around the seat post.

In another embodiment, the seat post further comprises a seat clamp assembly mounted at the seat end thereof for clamping the seat to the seat post.

In a further embodiment, the seat comprises a top sitting face and an opposed bottom face, the seat further comprising a nose, an opposed rear portion and a pair of rails extending therebetween along the bottom surface of the seat for securely engaging the seat clamp assembly.

In another embodiment, the sleeve and the seat post have a circular section.

In yet another embodiment, the sleeve is secured to the frame using a dedicated sleeve securing tool.

In a further embodiment, the bicycle frame is part of a bicycle used in a bicycle sharing program, the dedicated sleeve securing tool being in possession of an operator of the bicycle sharing program.

In another embodiment, the sleeve, seat post and compartment are made of a material selected from a group consisting of aluminum, aluminum alloys, steel, steel alloys, magnesium, magnesium alloys, titanium, titanium alloys, carbon fiber and thermoplastic.

According to another aspect, there is provided a saddle anti-theft assembly for a bicycle provided with a seat tube having a bottom end and a top end.

The saddle anti-theft assembly comprises a saddle tube slidable in said seat tube between a retracted position and an extended position, said saddle tube comprising a first end for securing a saddle thereto and a second end engaged in said seat tube; a stopper provided at said second end of said saddle tube; a stop rod mounted in said seat tube, said stop rod comprising a lower end fastened to said seat tube proximal to said bottom end thereof and an upper end extending above said stopper of said saddle tube; a stop means provided on said upper end of said stop rod, said stop means being configured to engage said stopper of said saddle tube when said saddle tube is in said extended position, thereby preventing said saddle tube from being slid beyond said extended position.

According to another aspect, there is provided a seat anti-theft assembly kit for use with a bicycle frame.

The seat anti-theft assembly kit comprises a sleeve having a closed end, an open end and a sleeve chamber extending therebetween, the sleeve being mountable to the bicycle frame; a seat post having a seat end configured for receiving a seat thereon and an opposed engaging end adapted for engaging the sleeve chamber through the open end; a compartment mountable to the bicycle frame, adjacent to the closed end of the sleeve, the compartment having therein a compartment cavity, the compartment further having an access opening therein sized and shaped to allow access to the compartment cavity; a first stopping member mountable in the sleeve chamber; and a second stopping member associatable with the seat post, the second stopping member being configured for collaborating with the first stopping member to allow slidable movement of the seat post along a restricted path of travel.

In one embodiment, the seat anti-theft assembly kit further comprises a seat mountable to a seat end of the seat post.

In another embodiment, the compartment further comprises a compartment cover securable on the access opening for preventing unwanted access to the hollow portion of the frame.

In yet another embodiment, the first stopping member comprises a rod having a connecting end for connecting the rod to the closed end of the sleeve and a first stopping end located away from the connecting end, the seat anti-theft assembly kit further comprising fastening means for fastening the connecting end of the rod to the closed end of the sleeve.

According to another aspect, there is provided a method for installing a seat anti-theft assembly on a bicycle frame.

The method comprises providing a sleeve having a closed end, an open end and a sleeve chamber extending therebetween, the sleeve being mountable to the bicycle frame; mounting the sleeve to the bicycle frame; providing a compartment having therein a compartment cavity, the compartment further having an access opening therein sized and shaped to allow access to the compartment cavity; mounting the compartment to the bicycle frame, adjacent to the closed end of the sleeve; providing a seat post having a seat end configured for receiving a seat thereon and an opposed engaging end; providing a first stopping member and a second stopping member; mounting the second stopping member to the seat post, proximal to the engaging end thereof; slidably inserting the seat post engaging end in the sleeve chamber through the open end of the sleeve; mounting the first stopping member in the sleeve chamber, the first stopping member being configured for collaborating with the second stopping member to allow slidable movement of the seat post along a restricted path of travel.

In one embodiment, the first stopping member comprises a rod having a connecting end and a first stopping end located away from the connecting end; further wherein the mounting of the first stopping member in the sleeve chamber further comprises connecting the connecting end to the closed end of the sleeve.

The skilled addressee will appreciate that the compartment facilitates the installation of the seat anti-theft assembly, while keeping access to it restricted.

In a further embodiment, the second stopping member comprises an annular flange defining a rod opening for slidably receiving therein the rod; further wherein the mounting of the first stopping member in the sleeve chamber further comprises slidably engaging the rod through the rod opening.

In another embodiment, the compartment further comprises a compartment sidewall defining the closed end of the sleeve, the compartment sidewall including a sidewall opening adapted to receive the connecting end of the rod therein; further wherein the mounting of the first stopping member in the sleeve chamber further comprises providing fastening means adapted for fastening the connecting end of the rod to the compartment sidewall, accessing the connecting end and the compartment sidewall through the access opening and fastening the connecting end of the compartment sidewall using the fastening means.

BRIEF DESCRIPTION OF THE DRAWINGS

In order that the invention may be readily understood, embodiments of the invention are illustrated by way of example in the accompanying drawings.

FIG. 9 is a drawing showing a cross-sectioned view, taken along line AA-AA of FIG. 2, of the bicycle frame comprising a seat anti-theft assembly shown in FIG. 2, wherein the seat post is in a partially extended position.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
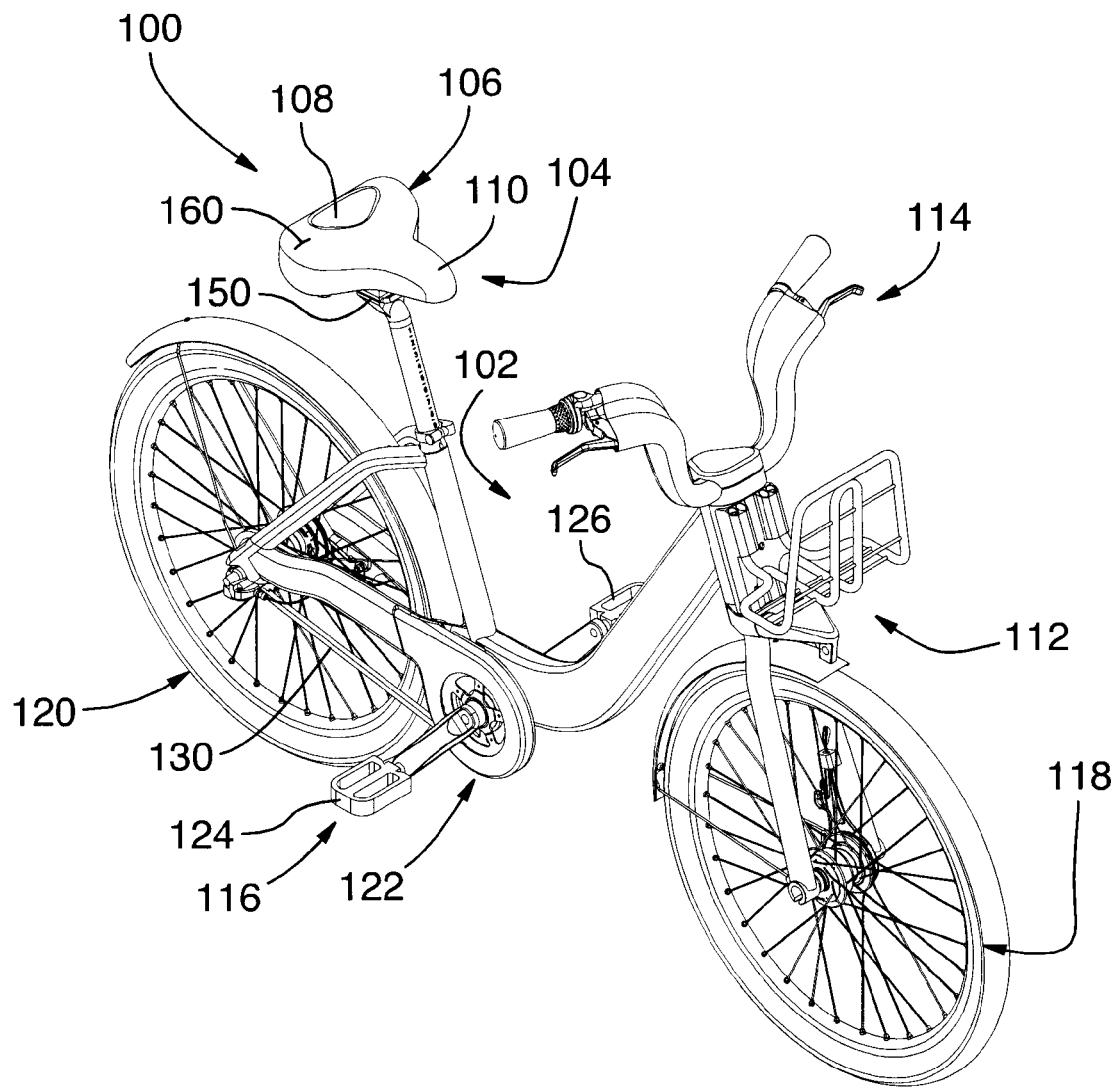
FIG. 1 is a drawing showing a perspective view of a bicycle, in accordance with one embodiment.

Now referring to FIG. 1, there is shown a bicycle 100 according to one embodiment. In the embodiment shown, the bicycle 100 comprises a bicycle frame 102, a seat assembly 104 mounted to the bicycle frame 102, the seat assembly 104 being provided for a user to sit on while riding the bicycle 100, and a rear wheel 120 rotatably mounted to the bicycle frame 102.

In the embodiment shown in FIG. 1, the seat assembly 104 comprises a saddle or seat 106. In one embodiment, the seat 106 comprises a generally pear shaped shell covered with padding. In such an embodiment, the pear shaped shell comprises a wide rear portion 108 having an elongated portion or nose 110 extending forwardly therefrom.

It will be appreciated that the seat 106 may have various designs according to aesthetic and/or ergonomic considerations.

Still in this embodiment, the seat 106 further comprises a top sitting surface 160 on which a user of the bicycle 100 may sit while operating the bicycle 100 and an opposed bottom surface, not shown. In one embodiment, the seat 106 further comprises a pair of rails, not shown, running along the bottom surface, not shown, of the seat 106 from the nose 110 to the rear portion 108, generally parallel to the nose 110. The pair of rails, not shown, structurally connects the saddle 106 to the bicycle 100, as it will become apparent below.

In one embodiment, the bicycle further comprises a front fork assembly 112 operatively mounted to the bicycle frame 102 and a front wheel 118 rotatably 114 mounted to the fork assembly 112. Mounted on the fork assembly 112 is a handlebar 114 for allowing the user to control the direction of the bicycle 100, as is commonly known in the art.

Still referring to FIG. 1, the bicycle 100 further comprises a drive assembly 116 mounted to the bicycle frame 102.

In the embodiment shown in FIG. 1, the drive assembly 116 is mounted between the front wheel 118 and the back wheel 120, below the seat assembly 104. It will be appreciated that in this configuration, the drive assembly 116 is advantageously positioned to enable a user sitting on the seat assembly 104 to operate the drive assembly 116 using his legs and feet.

Still in the embodiment shown in FIG. 1, the drive assembly 116 comprises a chain drive assembly, as will be further described later. This type of drive assembly is commonly used on bicycles and comprises a crankset assembly 122 whereon are operatively mounted a pair of right and left pedals 124 and 126. In one embodiment, power is transmitted from the crankset assembly 122 to the rear wheel 128 using a chain 130 looped therebetween.

In an alternative embodiment, the drive assembly 116 comprises a shaft drive assembly comprising a driveshaft instead of a chain to transmit power from the crankset assembly 122 to the rear wheel. This embodiment advantageously reduces the risk of injury being caused by a piece of clothing or a body part of a user riding the bicycle 100 getting caught in the rotating chain.

In yet another embodiment, the drive assembly 116 comprises a belt instead of a chain 130. Since no lubrication is required in such a system, this embodiment advantageously prevents a user from getting grease stains on his clothes from a lubricated chain.

Other embodiments of bicycles may be used, for instance hydraulic bicycles or hybrid bicycles. The skilled addressee will appreciate that a common feature of those embodiments is that they all comprise a seat 106, and are therefore exposed to seat theft.

Figure 2:
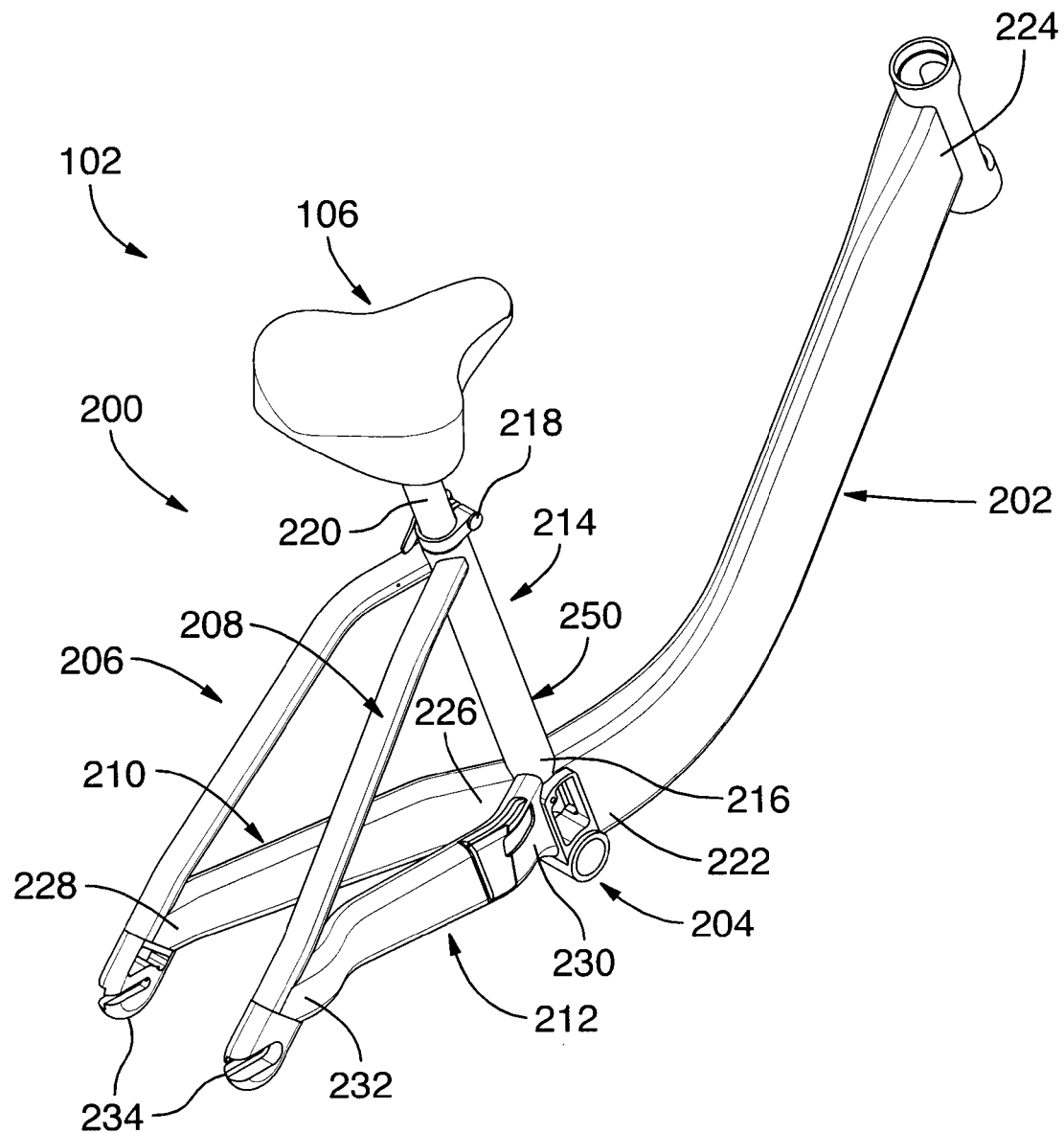
FIG. 2 is a drawing showing a perspective view of the bicycle frame for the bicycle shown in FIG. 1 in accordance with one embodiment, the bicycle frame comprising a seat anti-theft assembly.

Now turning to FIG. 2, there is shown an embodiment of a bicycle frame 102 and an embodiment of a seat anti-theft assembly 200 for use with the bicycle frame 102. The bicycle frame 102 comprises a down tube 202, a bottom bracket shell 204, a left seat stay 206, a right seat stay 208, a left chain stay 210 and a right chain stay 212.

The seat anti-theft assembly 200 comprises a sleeve 214 mounted to the bicycle frame 102. In one embodiment, the sleeve 214 has a closed end 216 and an open end 218. In the embodiment shown in FIG. 2, the sleeve 214 comprises a seat tube 250 extending generally upwardly from the bottom bracket shell 204, its closed end 216 being securely connected to the bottom bracket shell 204.

Still referring to FIG. 2, the sleeve 214 is hollow and further comprises a sleeve chamber or seat tube chamber, not shown in FIG. 2, extending between the closed end 216 and the open end 218 thereof for receiving therein a seat post 220 of the seat assembly 104, as will be described further below. Still in the embodiment shown in FIG. 2, the open end 218 of the sleeve 214 is facing generally upwardly and enables slidable insertion of the seat post 220 in the sleeve chamber, not shown in FIG. 2, as it will become apparent below.

Still in the embodiment shown in FIG. 2, the down tube 202 comprises a first end 222 secured to the bottom bracket shell 204 and a second, opposed end 224 adapted for mounting the front fork assembly 112, not shown, thereto. The down tube 202 extends from the bottom bracket shell 204 towards the front of the bicycle 100, not shown in FIG. 2. In one embodiment, the down tube 202 is curved upwardly such that its second end 224 is positioned at a greater height than its first end 222.

It will be appreciated that the weight of a user riding the bicycle may tend to exert bending strain on the down tube 202. In one embodiment, the down tube 202 comprises a tube having a box beam configuration. This configuration advantageously confers great bending resistance to the down tube 202.

In an alternate embodiment, the bicycle frame 102 further comprises a top tube extending between the upper open end 218 of the sleeve 214 and the second end 224 of the down tube 202. This configuration further provides the bicycle frame with great robustness.

Still in the embodiment shown in FIG. 2, the left chain stay 210 and the right chain stay 212 are connected to the bottom bracket shell 204 and extend towards the back of the bicycle 100 while diverging from each other. More specifically, the left chain stay 210 comprises a first end 226 secured to the bottom bracket shell 204 and a second, opposed end 228. Similarly, the right chain stay 212 comprises a first end 230 secured to the bottom bracket shell 204 proximal to the first end 226 of the left chain stay 210 and a second, opposed end 232. The second ends 228, 232 of the left and right chain stay 210, 212 are provided with axle mounting brackets 234 adapted for mounting an axle of the rear wheel, not shown, thereto.

Still in the embodiment shown in FIG. 2, the left seat stay 206 extends between the second end 228 of the left chain stay 210 and the upper open end 218 of the sleeve 214. Similarly, the right seat stay 208 extends between the second end 232 of the right chain stay 212 and the upper open end 218 of the sleeve 214.

It will be appreciated that the left and right seat stays 210, 212 are mounted in a support beam configuration and are provided for supporting the sleeve 214, slightly inclined backwardly in the embodiment shown in FIG. 2, when a user is riding the bicycle 100.

In one embodiment, the down tube 202, the bottom bracket shell 204, the sleeve 214, the left seat stay 206, the right seat stay 208, the left chain stay 210 and the right chain stay 212 are made of a rigid material such as for instance an alloy made of at least one of aluminum, magnesium, titanium or the like, which provides great robustness to the bicycle.

In an alternative embodiment, the bicycle frame 102 is made of a rigid lightweight material such as carbon fiber, fiberglass, or a thermoplastic such as polyvinyl chloride, polypropylene, acrylonitrile butadiene styrene or polycarbonate, all of which contributes to reducing the overall weight of the bicycle 100.

The skilled addressee will appreciate from the above description that the left and right chain stays 210, 212, the sleeve 214 and the down tube 202 are all mounted to the bottom bracket shell 204. In one embodiment, those elements are mounted to the bottom bracket shell 204 using techniques known to the skilled addressee such as welding, gluing or the like. In an alternative embodiment, those elements are mounted to the bottom bracket shell 204 using fasteners such as screws, rivets or the like. In yet another embodiment, those elements are mounted and secured to the bottom bracket shell 204 using a combination of the above mentioned techniques, for example a combination of gluing and using rivets, which would further enhance the robustness of the assembling.

It will be appreciated by the skilled addressee that the bicycle frame 102 may have various other configurations known to the skilled addressee and that the configuration disclosed herein is merely provided as an example.

Figure 3:
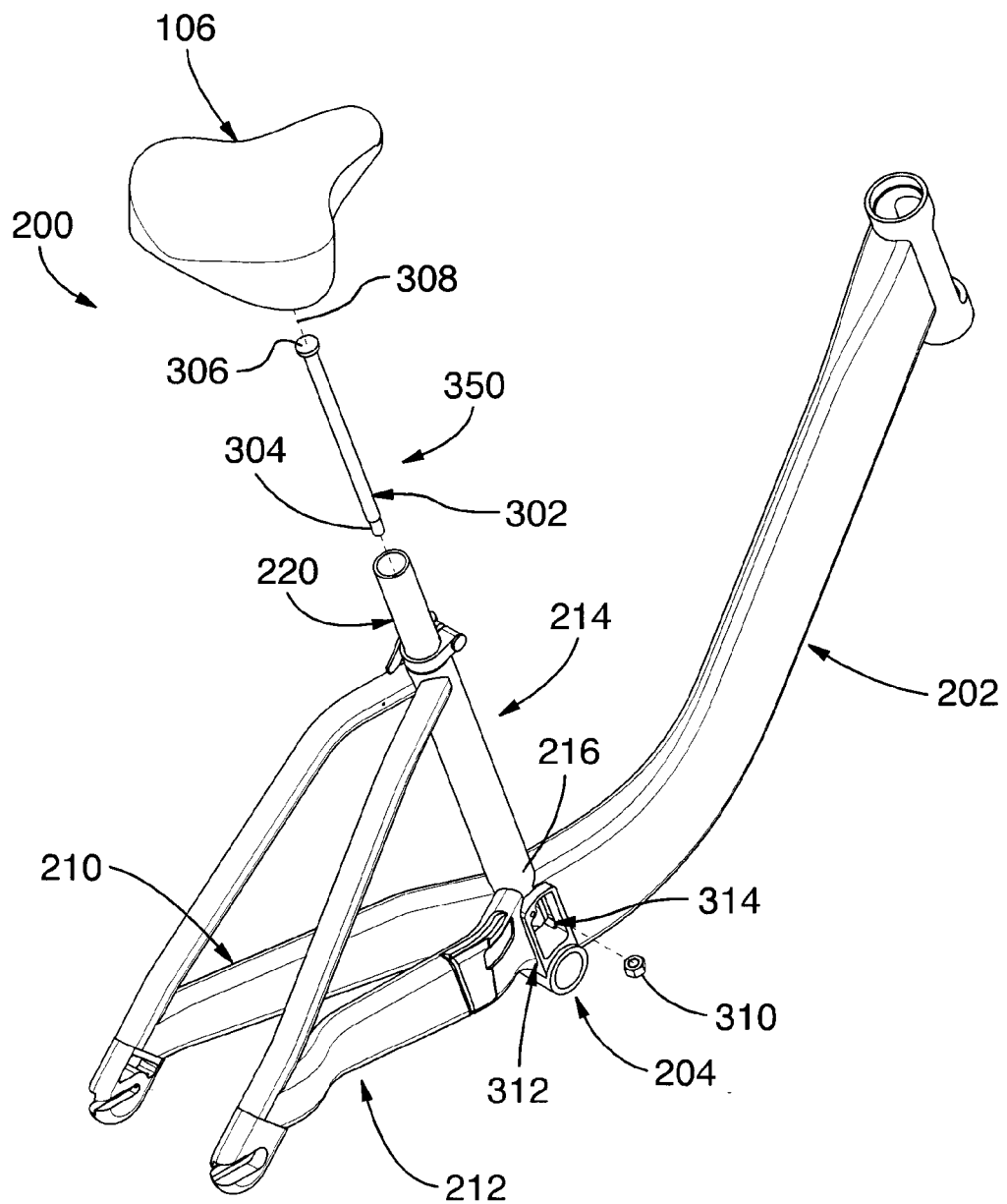
FIG. 3 is a drawing showing a perspective view, partly exploded, of the bicycle frame comprising a seat anti-theft assembly shown in FIG. 2.

Now referring to FIG. 3, there is shown a partly exploded view of the bicycle frame 102 disclosed in FIG. 2.

In the embodiment shown in FIG. 3, the seat anti-theft assembly 200 further comprises a first stopping member 350 mounted in the sleeve chamber, not shown. In this embodiment, the first stopping member 350 comprises a rod 302, the rod 302 having a connecting end 304 for connecting the rod 302 to the closed end 216 of the sleeve 214 and a first stopping end 306 located away from the connecting end 304.

More specifically and still in the embodiment shown in FIG. 3, the sleeve chamber 300 comprises a sleeve chamber longitudinal axis 308. The rod 302 is fastened to the closed end 216 of the sleeve 214 and extends therefrom towards the open end 218 of the sleeve 214, along the sleeve chamber longitudinal axis 308.

In one embodiment, fastening means 310, an example of which is a nut, are used for fastening the connecting end 304 of the rod 302 to the closed end 216 of the sleeve 214. More specifically, in the embodiment shown in FIG. 3, the fastening means 310 are adapted to threadingly cooperate with an externally treaded surface of the connecting end 304 of the rod 302 and to fix the rod 302 relatively to the sleeve 214, as will be further appreciated below.

Still referring to FIG. 3, it will be appreciated that, while the seat 106 has been removed to better show the rod 302 being mounted in the sleeve 214, the seat 106 is not securely connected to the rod 302. This configuration enables the seat 106 to be raised or lowered while the rod 302 remains fastened to the closed end 216 of the sleeve 214, as it will become apparent below.

Still referring to FIG. 3, the seat anti-theft assembly 200 further comprises a compartment 312 mounted to the bicycle frame 102, adjacent to the closed end 216 of the sleeve 214. The compartment 312 has therein a compartment cavity 700, best shown in FIG. 7, in communication with a hollow portion of the bicycle frame 102. Moreover, the compartment 312 further has an access opening 314 therein sized and shaped to allow access to the compartment cavity. In one embodiment, the compartment 312 is mounted on the bottom bracket shell 204, as it will become apparent below.

In one embodiment, the down tube 202 and at least one of the two chain stays 210, 212 are hollow and each comprises a passageway for passing cables and/or wires therethrough. In such an embodiment, the cables and/or wires may be routed between the down tube and the two chain stays 210, 212 through the bottom bracket shell 204, as it will become apparent below.

Figure 4:
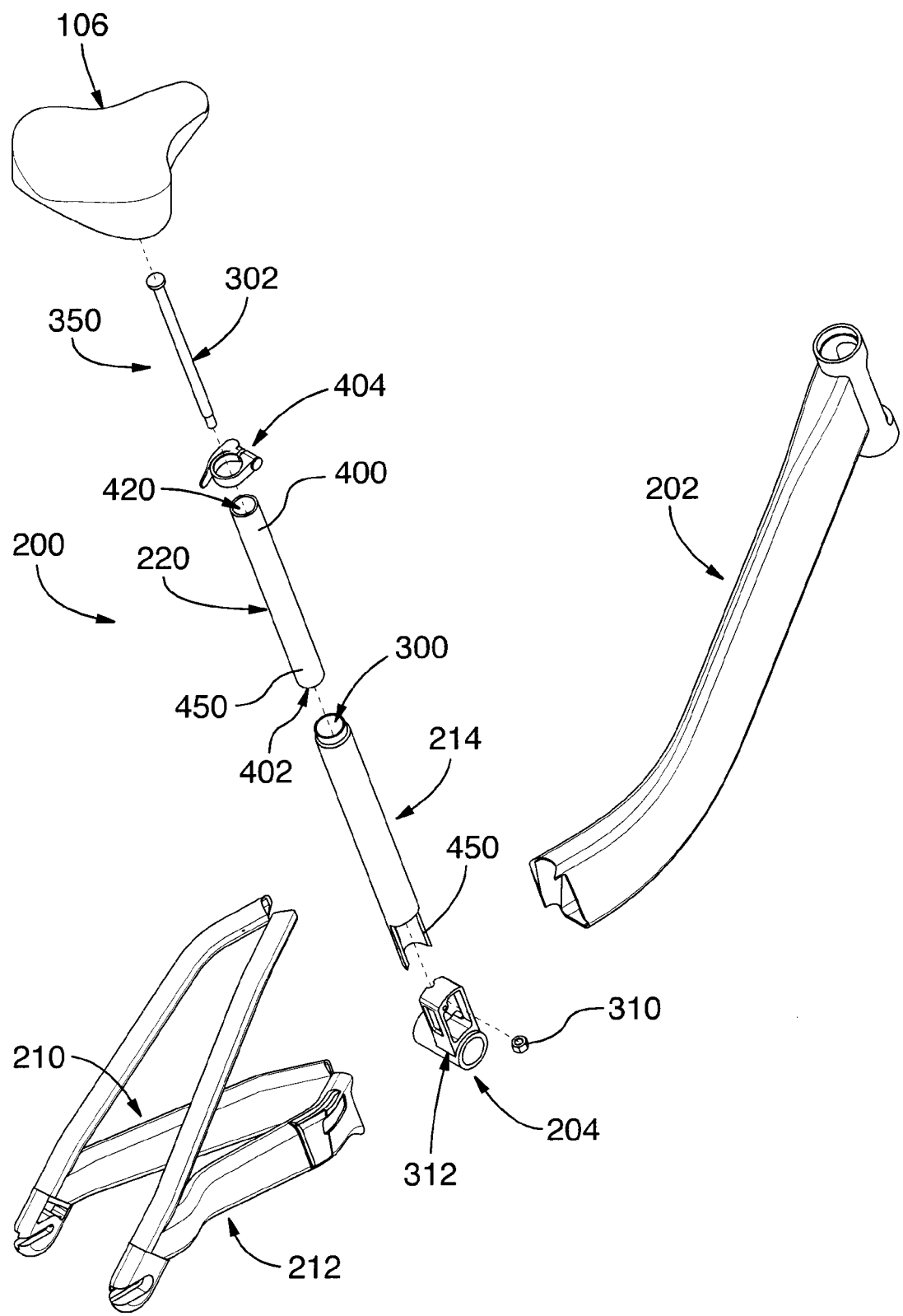
FIG. 4 is a drawing showing an exploded perspective view of the bicycle frame comprising a seat anti-theft assembly shown in FIG. 2.

Now referring to FIG. 4, there is shown another exploded view of the seat anti-theft assembly 200.

In the embodiment shown in FIG. 4, the seat post 220 is telescopically mounted in the sleeve chamber 300. More specifically, the seat post 220 comprises a seat end 400 configured for receiving the seat 106 thereon and an opposed engaging end 450 adapted for engaging the sleeve chamber 300 through the open end 218 of the sleeve 214.

Associated with the seat post 220 is a second stopping member 402, best shown in FIGS. 8 to 11B. The second stopping member 402 is configured for cooperating with the first stopping member 350 to allow slidable movement of the seat post 220 along a restricted path of travel.

Now referring back to FIG. 1, the seat post 220 further comprises a seat clamp assembly 150 mounted at its seat end 400 for clamping the seat 106 to the seat post 220. In one embodiment, the pair of rails are engaged in the seat clamp assembly 150 and then fastened to the seat clamp assembly 150 using secure fastening means such as a security screw or the like.

The skilled addressee will appreciate that such fastening means may only be fastened and unfastened using a special tool, the special tool being in the possession of a user of the bicycle, of an owner of the bicycle, of a manufacturer of the bicycle or, in the case of a rented bicycle, a rental program operator. In such an embodiment, the seat 106 would thus advantageously be secured to the seat post 220 and therefore protected from theft by a malicious individual.

In an alternative embodiment, the seat 106 is welded to the seat post 220 using welding techniques known to the skilled addressee. In an alternative embodiment, the seat 106 and seat post 220 are provided as an integral structure. It will be appreciated that these last two configurations provide the seat anti-theft assembly 200 with great resistance to theft and vandalism.

The skilled addressee will further appreciate that other means for securely mounting the seat 106 to the seat post 220 may be used.

Figure 8:
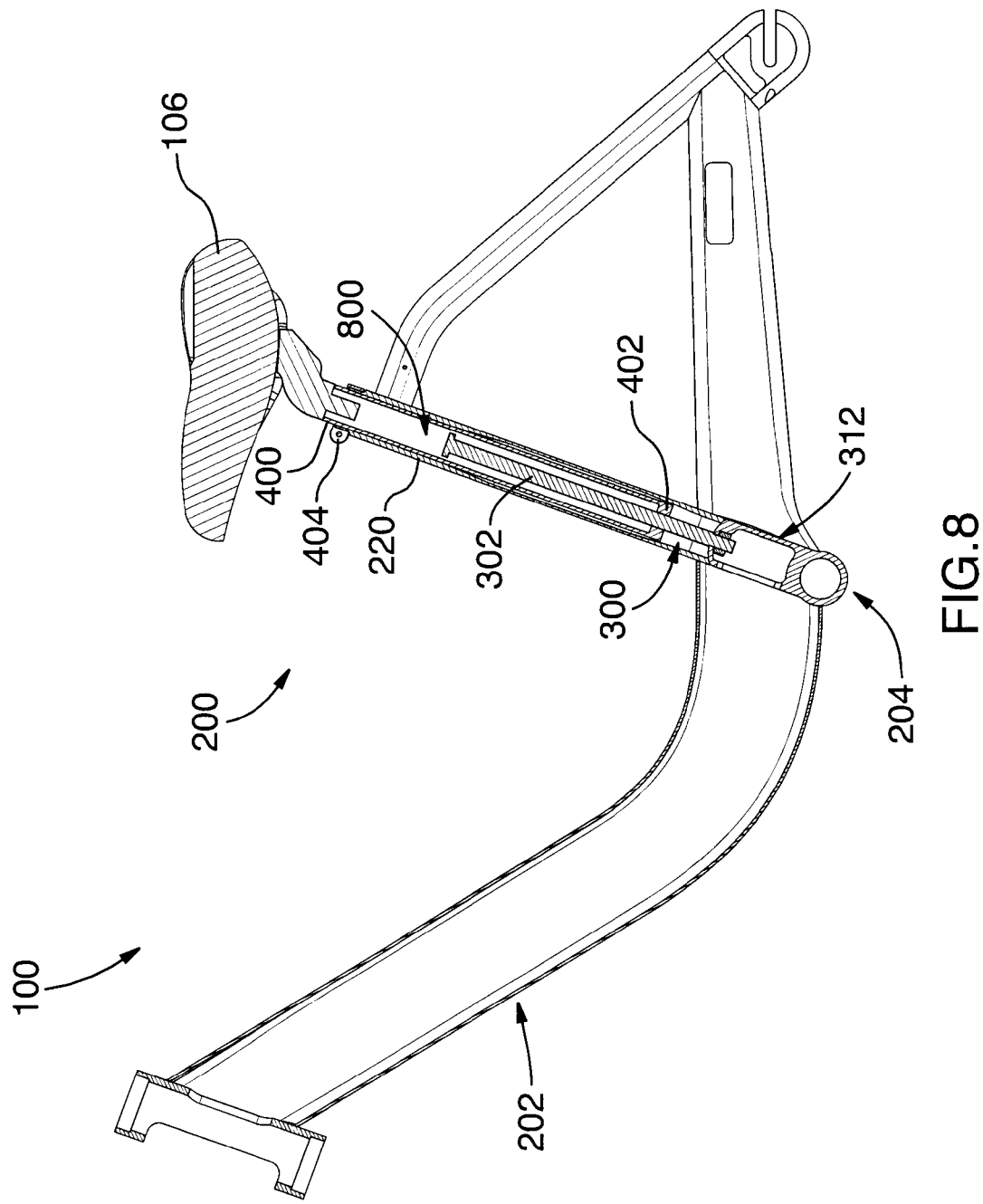
FIG. 8 is a drawing showing a cross-sectioned view, taken along line AA-AA of FIG. 2, of the bicycle frame comprising a seat anti-theft assembly shown in FIG. 2, wherein the seat post is in a retracted position.

In the embodiment shown in FIG. 8, the seat post 220 is hollow and further comprises a seat post chamber 800 extending between the seat end 400 and the second stopping member 402, the seat post chamber 800 being sized and shaped to slidably receive therein the rod 302.

Figure 10A:
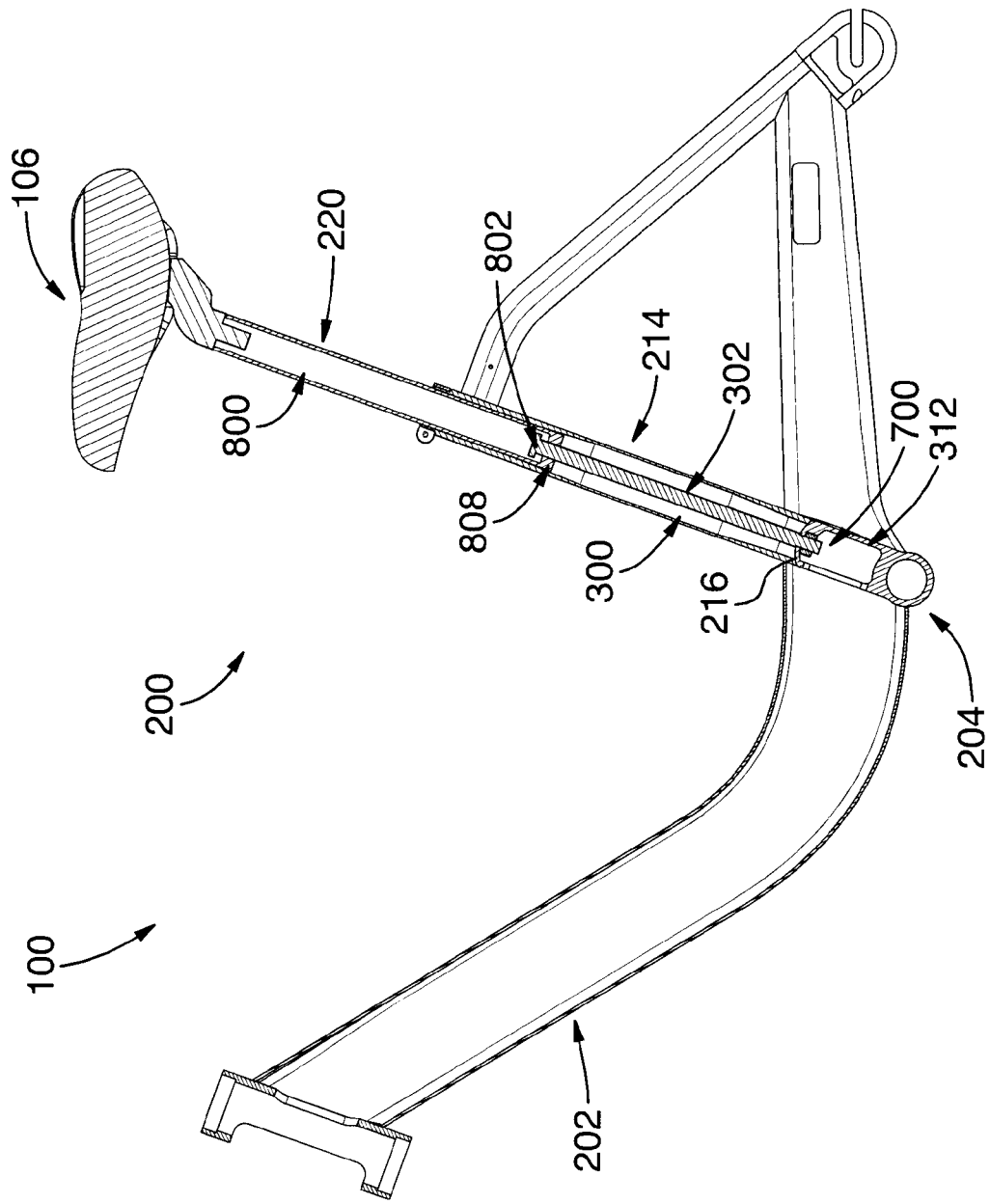
FIG. 10A is a drawing showing a cross-sectioned view, taken along line AA-AA of FIG. 2, of the bicycle frame comprising a seat anti-theft assembly shown in FIG. 2, wherein the seat post is in a further partially extended position.
Figure 10B:
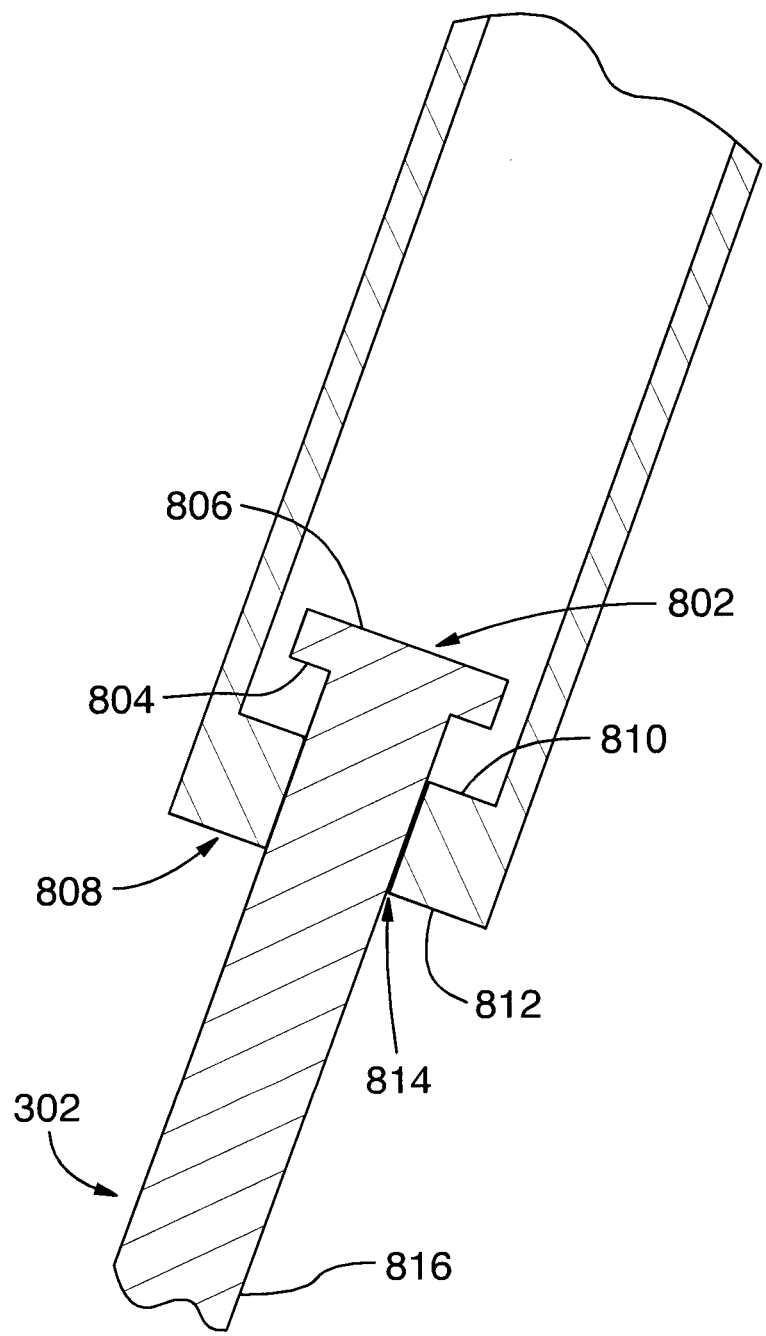
FIG. 10B is a drawing showing a partial view, enlarged, of the seat anti-theft assembly of FIG. 10A.

Now turning to FIGS. 10A and 10B, in one embodiment, the first stopping end 306 of the rod 302 comprises a first annular flange 802 having a first flange surface 804 for engaging the second stopping member 402. More specifically, the first flange surface 804 faces generally downwardly towards the connecting end 304 of the rod 302, and thus towards the closed end 216 of the sleeve 214. Still in this embodiment, a first opposed surface 806 of the first annular flange 802 is positioned opposite the first flange surface 804, generally parallel thereto, such that it faces towards the open end 218 of the sleeve 214.

Still in the embodiment shown in FIG. 8, the second stopping member 402 comprises a second annular flange 808 having a second flange surface 810 for engaging the first stopping member 350. More specifically, in one embodiment, the second flange surface 810 is located inside the seat post chamber 800 and faces generally upwardly, towards the seat end 400 of the seat post 220 and thus towards the open end 218 of the sleeve 214. Still in this embodiment, a second opposed surface 812 of the second annular flange 808 is positioned opposite the second flange surface 810, generally parallel thereto, such that it faces towards the closed end 216 of the sleeve 214.

In one embodiment, the second annular flange 808 defines a rod opening 814 for slidably receiving therein the rod 302. More specifically, the rod 302 is narrower than the first annular flange 802, while the first annular flange 802 is wider than the rod opening 814. During operation of the seat anti-theft assembly, the first annular flange 802 is thus engaged in the seat post chamber 800 while the rod shaft 816 is slidably engaged in the shaft opening 814, as shown in FIG. 8.

It will be appreciated by the skilled addressee that, in this configuration, the first flange surface 804 abuttingly engages the second flange surface 810 when the seat post 220 slides away from the closed end 216 of the sleeve 214 so as to stop the seat post 220, thus preventing removal or thereof from the bicycle 100, as it will become apparent below.

The skilled addressee will appreciate that in such an embodiment, if the seat 106, and therefore the seat post 220, is forcibly pulled upwardly and the first flange surface 804 abuttingly engages the second flange surface 810, the upward force exerted on the seat 106 will amount to tension distributed along the length of the rod 302. This is of great advantage, since it confers great robustness to the seat anti-theft assembly 200.

Other embodiments for the first and second stopping members are conceivable. For instance, in an alternative embodiment, the first stopping member comprises a stopping finger extending radially from the rod 302, the stopping finger being adapted to engage a corresponding groove defined on the seat post 220. More specifically, in such an embodiment, the corresponding groove extends parallel to the seat post chamber longitudinal axis 308 and is sized and shaped to slidably receive the stopping finger therein. The corresponding groove comprises a lower end and an upper which respectively define the lowermost and uppermost position of the seat 106.

One skilled in the art will appreciate that other combinations are possible, as long as the cooperation of the first stopping member and the seat post 220 restricts sliding of the seat post 220 in the sleeve 214.

Now turning back to FIG. 4, it will be appreciated that, in the embodiment shown, the sleeve 214 and seat post 220 have a circular cross-section. It will further be appreciated that, still in this embodiment, the diameter of the seat post 220 is slightly inferior to the diameter of the sleeve 214. Therefore, when the seat post 220 is engaged in the sleeve chamber 300, the seat post 220 snuggly fits therein, thereby advantageously restricting movement of the seat post 220 to a telescoping linear movement in the sleeve chamber 300 and a rotation of the seat post 220 in the sleeve chamber 300 around the sleeve chamber longitudinal axis 308.

Alternatively, the sleeve 214 and seat post 220 may not have a circular cross-section. For instance, in an alternative embodiment, the seat post 220 comprises a flat surface extending from the seat end to the second stopping member thereof. In such an embodiment, the sleeve 214 comprises a corresponding flat surface adapted to mate with the flat surface of the seat post 220 when the seat post 220 engages the sleeve opening 300. In another embodiment, the seat post 220 and sleeve 214 are respectively provided with a key and corresponding cooperable keyseat.

One will appreciate that these configurations prevent the rotation of the seat post 220 engaged in the sleeve chamber 300 relatively to the sleeve 214. This feature is of great advantage for keeping the seat 106 in a desired angular position, for instance in a position in which the nose 110 of the seat 106 extends towards the front of the bicycle 100, once the seat post 220 is engaged in the sleeve chamber 300.

Now referring back to FIG. 4, in the embodiment shown, the seat anti-theft assembly 200 further comprises seat position locking means 404 associated with the sleeve for selecting a position of the seat 106 relative to the bicycle frame 102. More specifically, the seat position selection means 404 is adapted to selectively lock the seat post 220 in a desired position along its restricted path of travel.

In one embodiment, the seat position selection means 404 comprises a split collar system mounted to the sleeve 214. More specifically, the seat position selection means 404 comprise a split collar adapted to be selectively tightened and loosened around the seat post 220 such that, when a user is riding the bicycle 100, the seat post 220 remains temporarily immobilized in a position selected by the user beforehand, as it will become apparent below.

Figure 5:
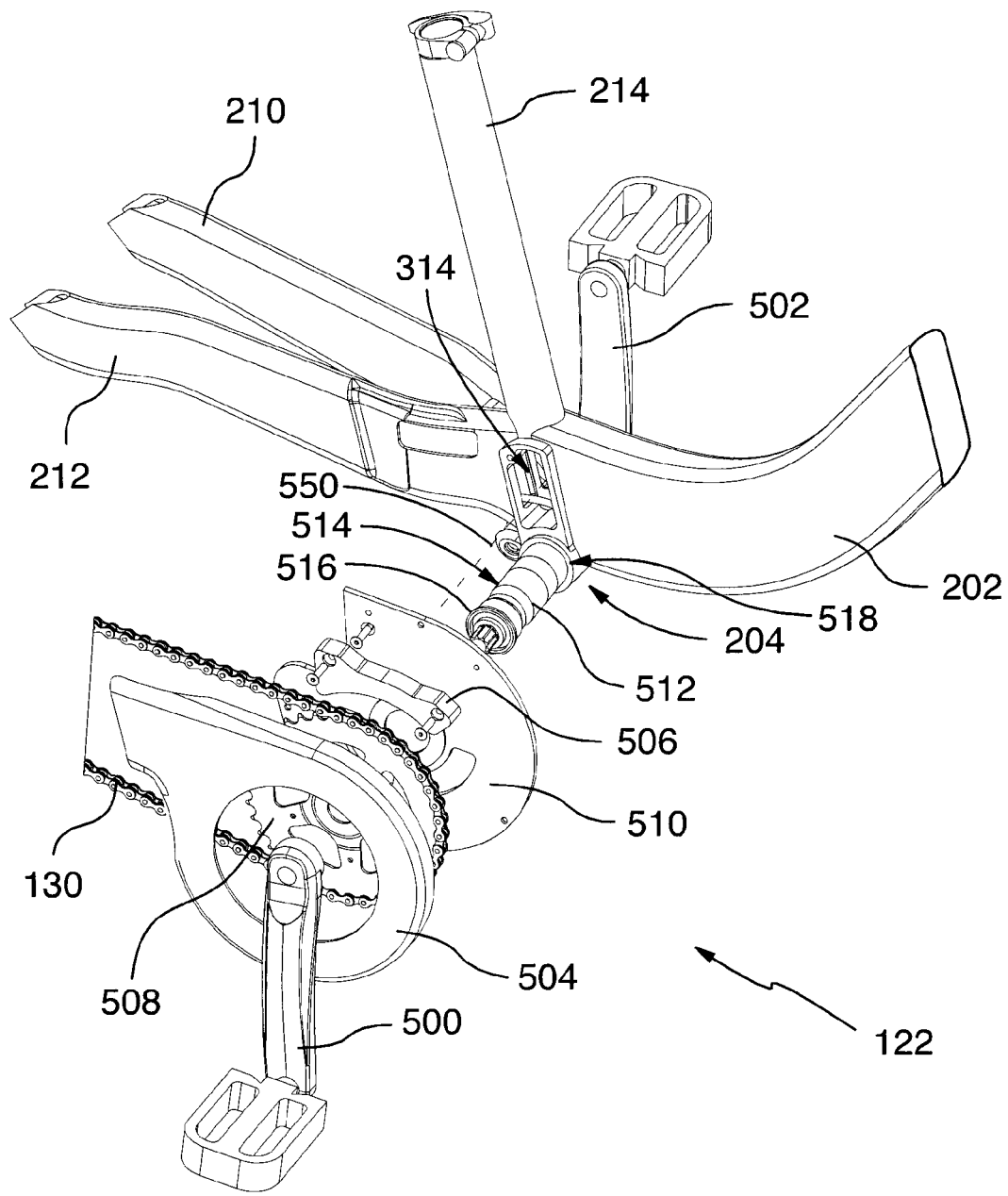
FIG. 5 is a drawing showing a left perspective view of a bottom bracket shell for the bicycle frame shown in FIG. 2, in accordance with one embodiment.

Now turning to FIG. 5, the crankset assembly 122 of the drive assembly 116 and the mounting of the rod 302 to the bicycle frame 102 will be detailed.

In the embodiment shown in FIG. 5, the crankset assembly 122 is mounted to the bottom bracket shell 204 and comprises a right crank arm 500, a left crank arm 502, a chain 130, a chain cover 504, a chain guide 506, a sprocket 508, a back plate 510 and a bottom bracket 512.

In one embodiment, the bottom bracket 512 comprises a generally cylindrical spindle 514 having a right end 516 whereon is mounted the right crank arm 500 and a left end, not shown, whereon is mounted the left crank arm 502. More specifically, the bottom bracket shell 204 comprises a bracket receiving tube 518 adapted to rotatably receive therein the bottom bracket 512, as will be further described below.

Such a crankset assembly 122 has been widely used since the inception of the bicycle and thus does not require further description, as one skilled in the art will appreciate.

It will be appreciated that, in the embodiment shown in FIG. 5, the chain 130, the chain cover 504, the chain guide 506, the sprocket 508 and the back plate 510 are positioned on the right side of the bicycle 100. The following description thus applies to such a configuration.

In an alternative embodiment, the chain 130, the chain cover 504, the chain guide 506, the sprocket 508 and the back plate 510 are instead positioned on the left side of the bicycle 100. In such an alternative embodiment, the skilled addressee will appreciate that all items described in the present description are mirrored over the bicycle frame 102 on the left side of the bicycle 100.

Accordingly, in the embodiment shown in FIG. 5, the compartment 312 is disposed such that its access opening 314 faces rightward. Further, the access opening 314 has an access opening axis 550, best shown in FIGS. 6 and 7, which is disposed orthogonal to the sleeve chamber longitudinal axis 308, not shown in FIG. 5. In the present embodiment, a user or operator may therefore gain access to the compartment 312 by the right side of the bicycle 100 where the access opening 314 is located.

Now referring to FIGS. 6 and 7, the bottom bracket shell 204 will now be described.

Figure 6:
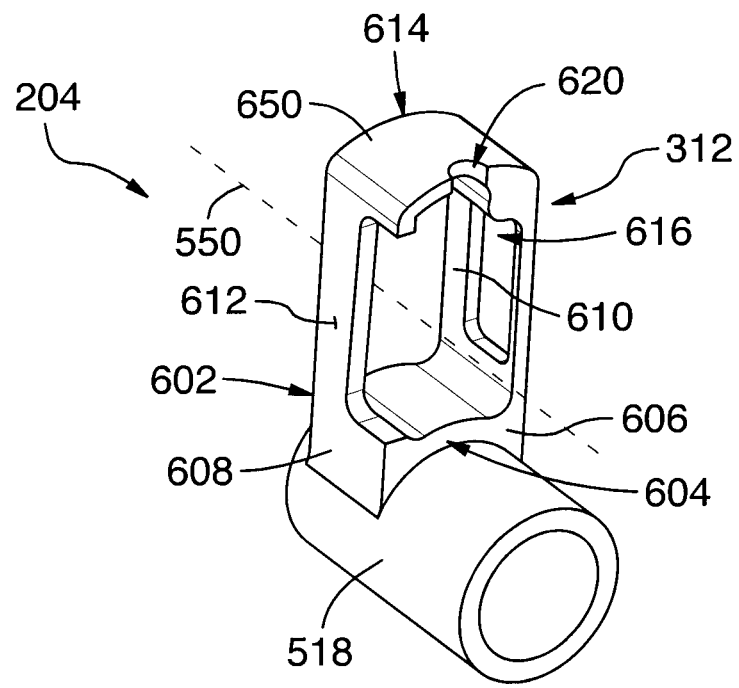
FIG. 6 is a drawing showing a right perspective view of the bottom bracket shell shown in FIG. 5.
Figure 7:
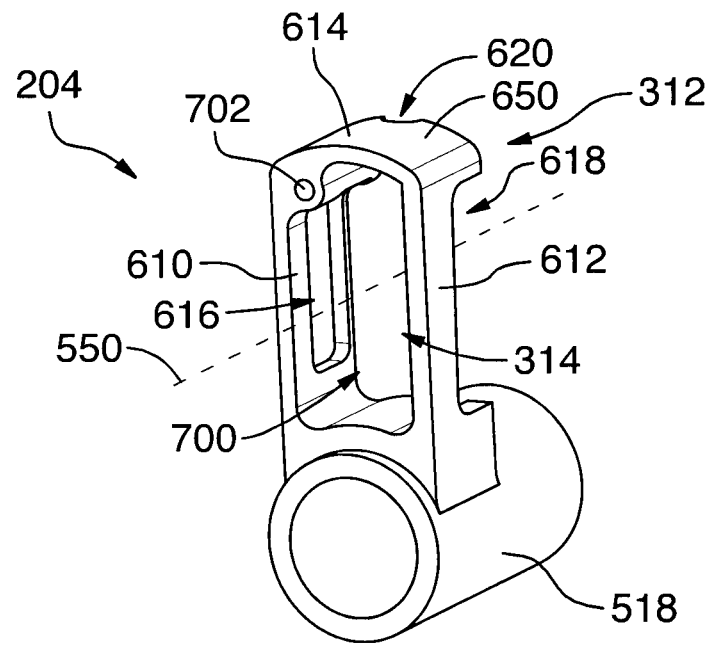
FIG. 7 is a drawing showing a perspective view, enlarged and partially exploded, of the bicycle shown in FIG. 1, provided to better show the mounting of the crankset assembly onto the bicycle frame.

In this embodiment, the bottom bracket shell 204 comprises the bracket receiving tube 518 adapted to receive the bottom bracket 512, not shown in FIGS. 6 and 7, and the compartment 312 sitting on the bracket receiving tube 518.

More specifically, the compartment 312 extends generally radially and outwardly from the bracket receiving tube 518. In one embodiment, the compartment 312 comprises a compartment sidewall 602 which defines the closed end 216 of the sleeve 214, best shown in FIGS. 8 to 11B. Moreover, the compartment sidewall 602 is configured for connecting the first stopping member 350 to the compartment 312. In one embodiment, the compartment sidewall 602 is further configured to receive therein the rod 302, not shown in FIGS. 6 and 7, as it will become apparent below.

The compartment 312 further comprises a base 604 for mounting the compartment 312 to the bracket receiving tube 518. In the embodiment shown in FIGS. 6 and 7, the base 604 is adapted to be securely mounted on the bracket receiving tube 518. As such, in one embodiment, the base 604 is curved such that it may be mated with a bracket receiving tube 518 having a circular cross-section.

In such an embodiment, the base 604 may be welded, glued or otherwise secured to the bracket receiving tube 518 using techniques known to the skilled addressee.

Still referring to FIGS. 6 and 7, the base 604 comprises a first and second opposed ends 606, 608 wherefrom respectively extend upwardly and generally vertically a pair of opposed lateral portions 610, 612 of the compartment sidewall 602. The compartment sidewall 602 further comprises a compartment connecting portion 614 extending between the opposed lateral portions of the sidewall 610, 612, the compartment connecting portion 614 being positioned opposite the base 604. The skilled addressee will appreciate that in this configuration, the compartment sidewall 602 defines the compartment cavity 700.

Figure 13:
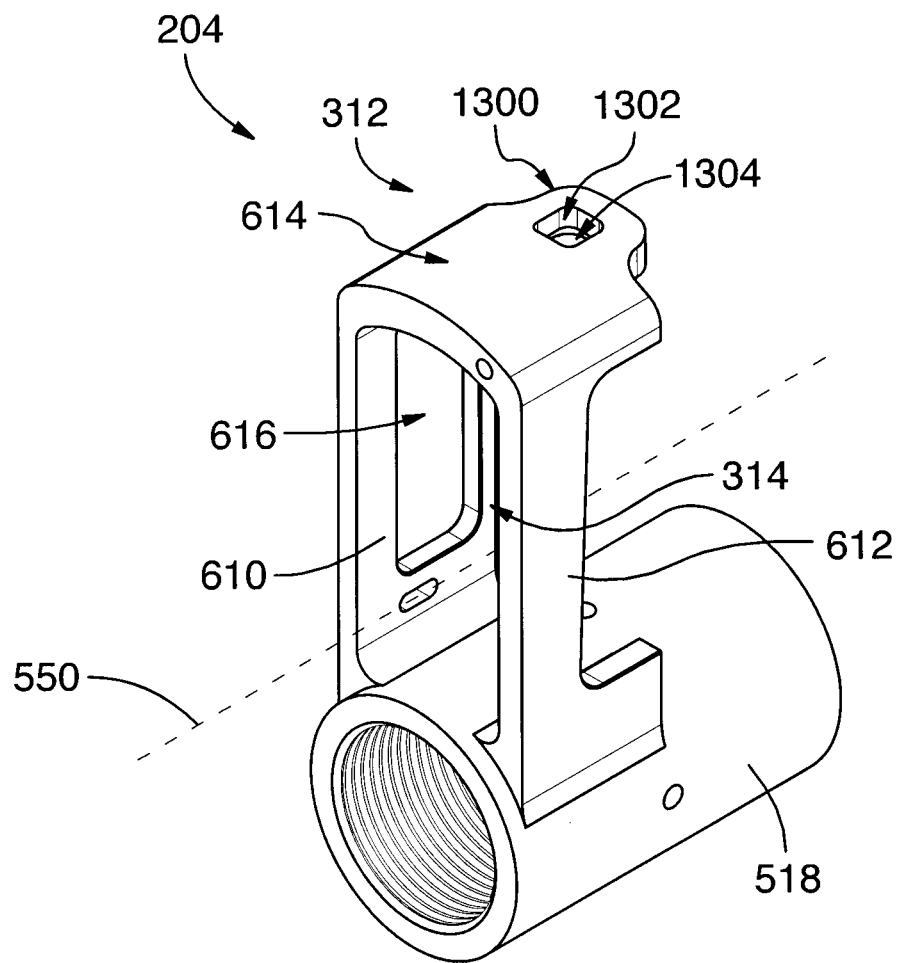
FIG. 13 is a drawing showing a perspective view of a bottom bracket shell for the bicycle frame shown in FIG. 2, in accordance with an alternative embodiment.

Now turning to FIG. 13, in an alternative embodiment, the compartment 312 does not comprise a base. In such an embodiment, the opposed lateral portions 610 and 612 of the compartment 312 are instead directly mounted to the bracket receiving tube 518, wherefrom they extend parallel to each other. In one embodiment, such a compartment 312 is manufactured using a machining process or a combination of machining processes known to the skilled addressee such as turning, milling, extruding or the like. This advantageously facilitates mass production of such a compartment, for instance for producing a large number of bicycles needed in a bicycle sharing program.

With references to FIGS. 5 to 7, a plurality of communication apertures are defined in the compartment sidewall 602. In one embodiment, the communication apertures are communicating with passageways defined inside the down tube 202 and at least one of the chain stays 210, 212. This is of great advantage for routing wires from the down tube 202 to the chain stays 210, 212, for instance.

Still in the embodiment shown in FIGS. 5 to 7, the left and right chain stays 210, 212 extend backwardly from a first lateral portion 610 of the compartment sidewall 602, as best shown in FIG. 4.

In one embodiment, the first lateral portion 610 has defined therein a first communication aperture 616 which provides communication between the compartment cavity 700 and the right chain stay 212.

Still in the embodiment shown in FIGS. 6 and 7, the downtube 202 extends forwardly from a second lateral portion 612 of the compartment sidewall 602, the second lateral portion 612 having an indent 618 defined thereon. In one embodiment, the indent 618 provides communication between the compartment cavity 700 and the down tube 202.

Still in the embodiment shown in FIGS. 5 to 7, the compartment connecting portion 614 includes a sidewall opening 620 adapted to receive the first stopping member 350 therein. More specifically, the sidewall opening 620 comprises a semi-circular indent adapted to receive therein the connecting end 304 of the rod 302, as it will become apparent below.

In an alternative embodiment, illustrated in FIG. 13, the compartment connecting portion 614 comprises a central portion 1300 extending parallel to the access opening axis 550, away from the access opening 314 of the compartment 312. In this embodiment, a recess 1302 in defined in the central portion 1300 and a hole 1304 is defined at the bottom of the recess 1302. The hole 1304 is adapted to receive therein the connecting end 304 of the rod 302, while the recess is adapted for receiving therein a correspondingly shaped portion of the connecting end 304 of the rod 302, as it will become apparent below.

With references to FIGS. 3 to 5, the installation of the seat anti-theft assembly 200 onto the bicycle frame 102 will now be described.

Now referring to FIG. 4, the sleeve 214 is first mounted to the bicycle frame 102. In one embodiment, the sleeve 214 comprises a hollow tube having a first open end 218 and a second opposed open end 450 shaped to be mounted on the compartment connecting portion 614 of the compartment sidewall 602. For instance, in the present embodiment, the compartment connecting portion 614 of the compartment sidewall 602 is convex relative to the sleeve chamber 300. Therefore, the second open end 450 of the sleeve 214 is complementary to the compartment connecting portion 614 such that the sleeve 214 may be mounted on the compartment in general alignment therewith, as best shown in FIGS. 8 to 11B.

In this embodiment, the second open end 450 is permanently connected to the compartment connecting portion 614 using techniques known to the skilled addressee such as welding or the like, the compartment connecting portion 614 thus defining the closed end 216 of the sleeve 214.

In an alternative embodiment, the sleeve 214 is mounted to the bicycle frame 102 such that it may be selectively secured and unsecured by using a dedicated sleeve securing tool. In an embodiment where the bicycle 100 is used in a bicycle sharing program, such dedicated sleeve securing tool is in possession of an operator of the bicycle sharing program. This embodiment advantageously enables the operator to selectively remove the sleeve 214 from the bicycle frame 102 for maintenance purposes, for instance.

Still referring to FIG. 4, the rod 302 is then inserted in the seat post 220. More specifically, the connecting end 304 of the rod 302 is inserted in the shaft opening 620, not shown in FIG. 4, of the second stopping member 402, the second stopping member having been mounted to the seat post, proximal to the engaging end 450 thereof. According to one embodiment, the seat end 400 of the seat post 220 comprises an open seat post end 420, by which the connecting end 304 of the rod 302 is introduced in the seat post 220 towards the sidewall opening 620.

Figure 12:
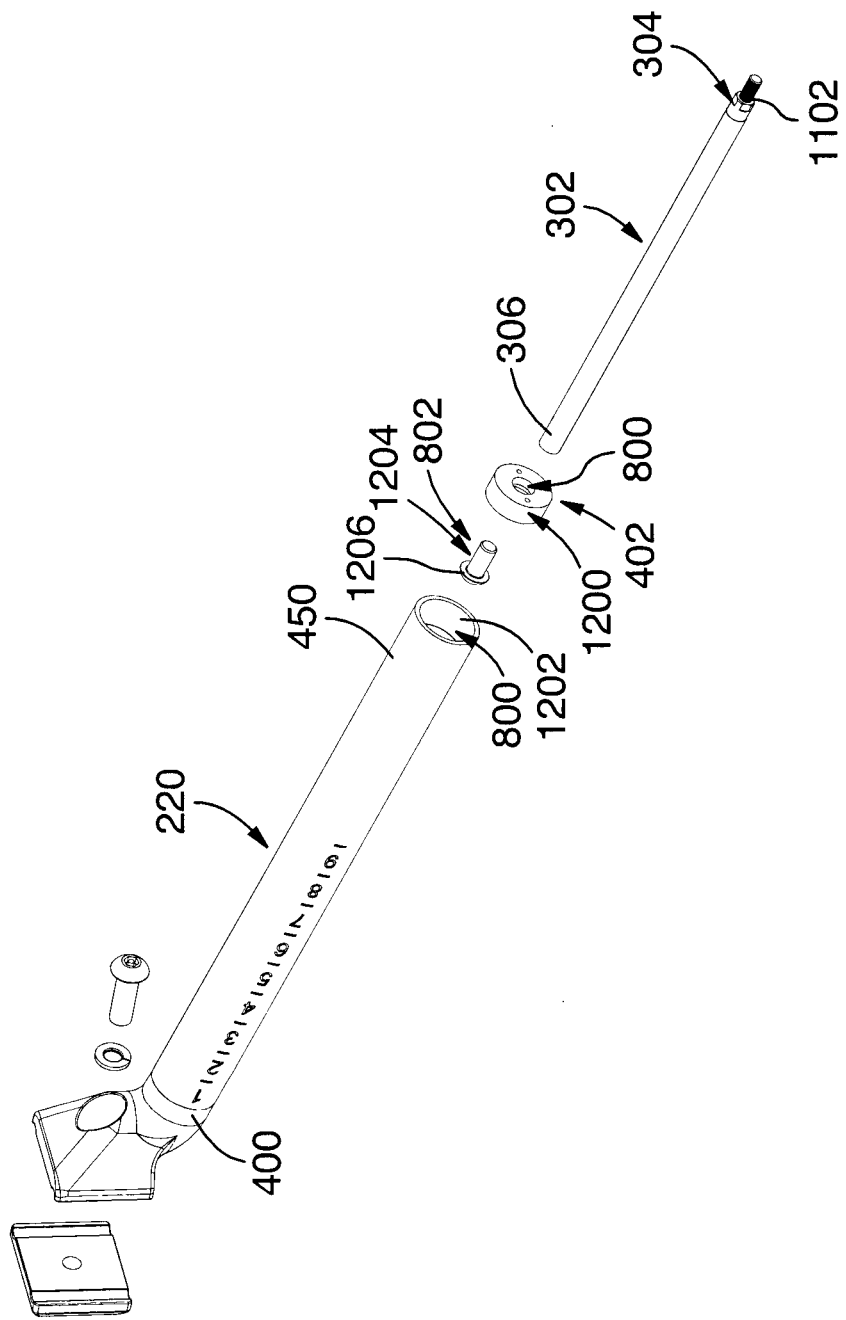
FIG. 12 is a drawing showing an exploded view of a seat post and a first stopping member of the seat anti-theft assembly, in accordance with one embodiment.

Now referring to FIG. 12, in an alternative embodiment, the second stopping member 402 is threadily mounted to the seat post near the engaging end 450 thereof. More specifically, in this embodiment, the second stopping member 402 comprises a punctured cap 1200 screwable at the engaging end 450 of the seat post 220, located opposite to the seat end 400 thereof.

It will be appreciated by the skilled addressee that this configuration facilitates insertion of the rod 302 in the seat post 220. Indeed, according to this configuration, one only needs to insert the connecting end 304 of the rod 302 through the shaft opening 800 defined on the punctured cap 1200 and to screw the punctured cap 1200 on a corresponding threaded receiving portion 1202 located at the engaging end 450 of the seat post 220, thus avoiding the burden of having to pass the rod 302 all the way through the seat post chamber 800.

In yet another embodiment, the first annular flange 802 is threadily mounted to the first stopping end 306 of the rod 302. More specifically, the first stopping end 306 of the rod 302 further comprises a stopping screw 1204 and the first annular flange 802 comprises the head 1206 of the stopping screw 1204. The stopping screw 1204 is mounted in a stopping screw receiving hole, not shown, extending axially and inwardly in the rod 302 from the first stopping end 306 thereof.

The skilled addressee will appreciate that this embodiment further facilitates the installation of the seat anti-theft assembly 200. One only need to insert the stopping screw 1204 in the punctured cap 1200, to fasten the stopping screw 1204 to the stopping end 306 of the rod 302 and to fasten the punctured cap 1200 to the corresponding threaded receiving portion 1202 of the seat post 220 to connect the rod 302 to the seat post 220.

The first stopping member is then mounted in the sleeve chamber. More specifically, in one embodiment, the rod 302 is inserted in the sleeve chamber 300 through the open end 218 of the sleeve 214, with the connecting portion 304 of the rod 302 being engaged in the sleeve chamber 300 such that it is directed towards the closed end 216 of the sleeve. The skilled addressee will appreciate that during this operation, in one embodiment, the seat post 220, having previously been connected to the rod 302, is also engaged in the sleeve chamber 300, its engaging end 450 being inserted in the sleeve chamber 300 through the open end 218 of the sleeve 214.

The rod 302 is inserted in the sleeve chamber 300 until the connecting end 304 of the rod 302 engages the sidewall opening 620.

In one embodiment, the rod 302 is further provided with positioning means for facilitating engaging the connecting portion 304 of the rod 302 in the sidewall opening 620.

For instance, in one embodiment, the positioning means comprise a washer sized and shaped to be slidably received in the sleeve chamber 300 while remaining concentrically positioned therewith, the washer comprising a central hole adapted to slidably receive the rod shaft 816 therein. In such an embodiment, the connecting end 304 of the rod 302 is first inserted in the central hole of the washer. The washer is then inserted in the sleeve chamber 300 such that the connecting end 304 of the rod 302 is directed towards the closed end 216 of the sleeve 214. The connecting end 304 is then moved towards the closed end 216 until the connecting end 304 engages the sidewall opening 620 of the compartment 312.

The skilled addressee will appreciate that this configuration enables the rod 302 to remain centered in the sleeve chamber 300 while the connecting end 304 is moved towards the closed end 216, effectively guiding the connecting end 304 of the rod 302 towards the closed end 216 of the sleeve 214, which is of great advantage.

Figure 11A:
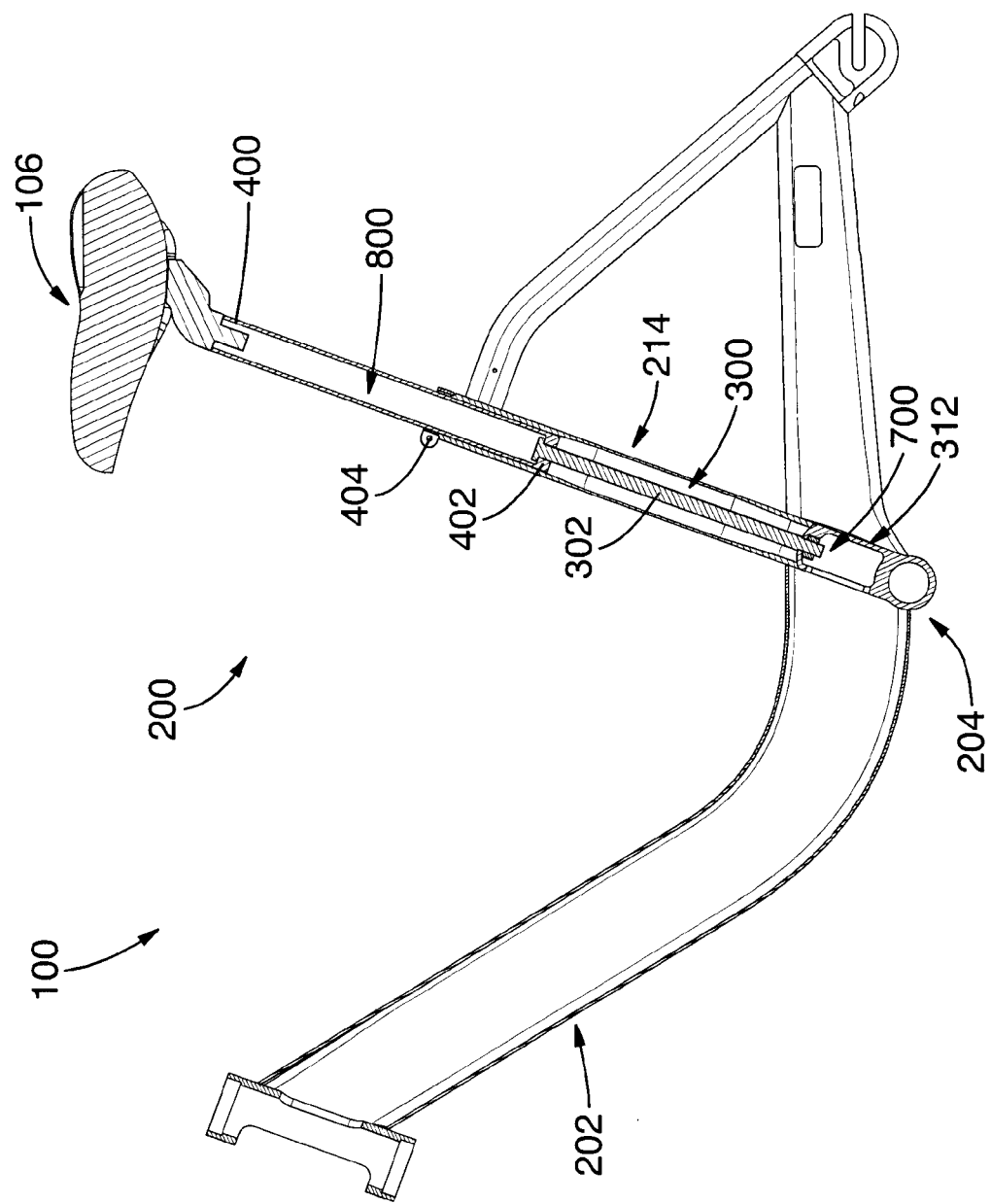
FIG. 11A is a drawing showing a cross-sectioned view, taken along line AA-AA of FIG. 2, of the bicycle frame comprising a seat anti-theft assembly shown in FIG. 2, wherein the seat post is in a fully extended position.
Figure 11B:
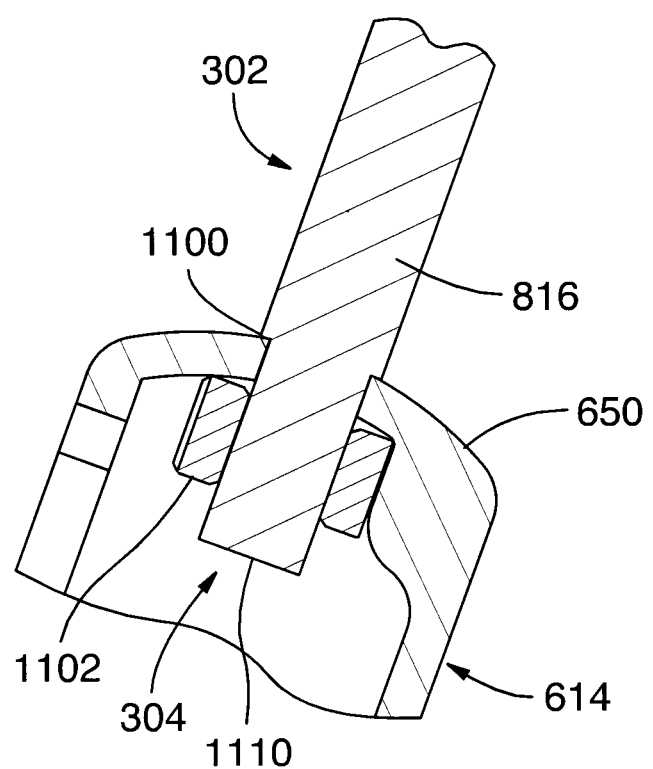
FIG. 11B is a drawing showing a partial view, enlarged, of the seat anti-theft assembly of FIG. 11A.

Now turning to FIG. 11B, in one embodiment, the connecting end 304 of the rod 302 comprises a fastening portion 1110 projecting outwardly from the connecting end 304, parallel to the rod 302. The fastening portion 1110 is adapted for engaging the sidewall opening 620, as it will become apparent below.

In one embodiment, the fastening means 310 are cooperable with the fastening portion 1110 for fastening the first stopping member to the closed end 216 of the sleeve 214. More specifically, in one embodiment, the fastening portion 1110 is narrower than the rod 302, thereby defining a shoulder 1100 between the rod 302 and the fastening portion 1110 for abuttingly engaging the compartment sidewall 602.

More specifically, in this embodiment, the shoulder 1100 abuts a top surface 650 of the compartment connecting portion 614, best shown in FIG. 6, when the connecting end 304 of the rod 302 is engaged in the shaft opening 620.

Moreover, the compartment sidewall 602 has a given thickness. In one embodiment, the fastening portion 1110 is longer than the given thickness of the compartment sidewall 602. In such an embodiment, the fastening portion 1110 may be engaged in the sidewall opening 620 such that a threaded portion of the fastening portion 1110 located away from the shoulder 1100 protrudes from the compartment sidewall 602 and into the compartment cavity 700.

In one embodiment, as described above, the seat anti-theft assembly 200 further comprises a nut 1102 adapted to threadily engage the threaded portion of the fastening portion 1110 protruding in the compartment cavity 700. The nut 1102 may be fastened so as to hold the compartment connecting portion 614 of the compartment sidewall 602 between the nut 1102 and the shoulder 1100 of the rod 302, thereby fixing the rod 302 to the compartment 312.

Now turning to FIGS. 12 and 13, in one embodiment, the shoulder 1100 has a noncircular cross-section. In this embodiment, the shoulder 1100 is adapted to engage the correspondingly shaped recess 1302 of the compartment connecting portion 614. The skilled addressee will appreciate that when the shoulder 1100 is engaged in the recess 1302, the rod 302 is prevented from rotating, thereby facilitating the fastening of the nut 1102, not shown in FIGS. 12 and 13, onto the threaded portion of the fastening portion 1110.

Now referring back to FIG. 11B, access to the nut 1102 is therefore provided by the access opening 314 of the compartment 312. For instance, an operator may use a tool such as a socket wrench or the like for fastening the nut 1102 when installing the seat anti-theft assembly 200 on the bicycle 100 or for unfastening the nut 1102 for maintenance of the seat anti-theft assembly 200.

This is of great advantage in a context where a bicycle having a seat anti-theft assembly 200 mounted thereon is used frequently and requires periodical maintenance, such as a bicycle used in a bicycle renting program.

In an alternative embodiment, the connecting end 304 of the rod 302 is instead permanently fixed to the compartment using techniques known to the skilled addressee such as welding, gluing or the like. In such an embodiment, removal of seat 106 from the bicycle 100 is made very difficult, thus contributing to prevent the theft of seats.

Now referring to FIG. 5, once the rod 302 has been fixed to the compartment 312, the crankset assembly 122 is mounted on the bicycle 100. More specifically, in one embodiment, the bottom bracket 512 is first inserted in the bracket receiving tube 518. The right and left ends of the bottom bracket 512 are now protruding axially on both sides of the bracket receiving tube 518.

In one embodiment, the compartment 312 further comprises a compartment cover removably mounted on the access opening 314 for preventing unwanted access to the compartment cavity 700.

For instance, in one embodiment, the crankset assembly 122 comprises the back plate 510, which is positioned orthogonal to the sleeve opening longitudinal axis. More specifically, still in this embodiment, the back plate 510 is provided with a fixation screw adapted to engage the corresponding screw receiving hole 702 of the compartment 312, as best shown in FIG. 7. Once the back plate 510 has been properly fixed to the compartment 312 by fastening the fixation screw to the screw receiving hole 702, the access opening 314 is blocked and the compartment 312 may not be accessed unless the back plate 510 is removed.

In one embodiment, the back plate 510 is selectively securable on the access opening 314 and unsecurable therefrom using a dedicated plate securing tool.

This is of great advantage, for instance in an embodiment where the bicycle frame 102 is part of a bicycle 100 used in a bicycle sharing program, the dedicated plate securing tool being in possession of an operator of the bicycle sharing program. In such an embodiment, access to the compartment 312 is therefore restricted to the operator of the bicycle sharing program, and therefore theft of the seat 106 may be prevented.

The left crank arm 502 may now be mounted on the left end, not shown, of the bottom bracket 512. The chain guide 506, sprocket 508, chain 130, chain guard 504 and right crank arm 500 are then mounted to the right end 516 of the bottom bracket 512 in a usual fashion known to the skilled addressee.

The skilled addressee will appreciate that this configuration has numerous advantages. Access to the compartment requires removal of at least part of the crankset assembly 122 from the bicycle 100, which is cumbersome and requires a great amount of time and proper tools to accomplish. Therefore, it is highly unlikely that a malevolent individual will undertake the dismantling of the whole crankset assembly by for the purpose of stealing the seat 106 in a crowded or well lit area.

Further, the compartment facilitates the installation of the system, while keeping access to it restricted. This is a great advantage when the holder is installed on a large number of bicycles.

Moreover, when the crankset assembly is mounted to the bicycle, the sleeve chamber 300 and seat post chamber 800 are not accessible. This advantageously prevents water and dust from entering and damaging the seat anti-theft assembly.

Furthermore, the seat anti-theft assembly comprises few parts and is therefore easy to manufacture. This is particularly advantageous when a large number of seat anti-theft assembly are needed, such as to be mounted on bicycles as part of a bicycle sharing program, for instance.

The operation of the seat anti-theft assembly 200 will now be described with references to FIGS. 8 to 11B.

In the embodiment shown in FIG. 8, the seat post 220 is in a first position in the sleeve chamber 300. The skilled addressee will appreciate that the seat post 220 may further be lowered in the sleeve chamber 300 until the seat 106 abuts the open end 218 of the sleeve 214 and thus prevents the seat post 220 from slidably moving further downwardly in the sleeve chamber 300.

In an alternative embodiment, the seat post 220 is longer than the sleeve chamber 300 and abuts the closed end 216 of the sleeve 214 when in its lowermost position.

Now turning to FIG. 9, the seat post 220 has been moved upwardly in the sleeve chamber 300. One will appreciate that the seat 106 is now in a higher position. One will further appreciate that the rod 302 is secured to the closed end 216 of the sleeve 214 and does not move when the seat post 220 moves upwardly.

Now turning to FIG. 10A, the seat post 220 has yet been further moved upwardly and the seat 106 is in yet a higher position. The skilled addressee will appreciate that when the seat 106 is positioned at a desired height, a user may activate the seat position selection means 404 to temporarily lock the seat post 220 in its position. The user may then use the bicycle 100 normally until a different seat position is desired. The user may then deactivate the seat position selection means 404 to allow the seat post 220 to once again be slidably moved in the sleeve chamber 300 along its restricted path of travel.

Now turning to FIG. 11A, the seat post 220 has now been moved to its uppermost position and further upward movement of the seat post 220 in the sleeve chamber 300 is restricted.

More specifically, in the embodiment shown in FIG. 11A, the first flange surface 804 abuttingly engages the second flange surface 810 when the seat post 220 slides away from the closed end 216 of the sleeve 214 and the seat post 220 is stopped.

The skilled addressee will appreciate that if the seat post 220 is forcefully pulled upwardly when the seat post 220 is in its uppermost position, the force exerted will be distributed along the first and second flange surfaces 804 and 810 abuttingly engaged together. This is of great advantage since it provides the seat anti-theft assembly with great robustness.

In one embodiment, the first and second flange surfaces each comprise a planar surface 804 and 810. Furthermore, in this embodiment, the first and second planar flange surfaces 804 and 810 are positioned parallel to one another. The skilled addressee will appreciate that this configuration enables if the seat post 220 is forcefully pulled upwardly when the seat post 220 is in its uppermost position, the force exerted will be distributed along a greater surface area, thereby providing the seat anti-theft assembly with even greater robustness.

Moreover, the skilled addressee will appreciate that the movement of the seat post 220 between its lowermost and uppermost positions requires minimal effort from a user and therefore facilitates adjustment of the height of the seat 106.

Although the above description relates to a specific preferred embodiment as presently contemplated by the inventor, it will be understood that the invention in its broad aspect includes mechanical and functional equivalents of the elements described herein.

The invention claimed is:

1. A seat anti-theft assembly for use with a bicycle frame, the seat anti-theft assembly comprising:
   a sleeve having a closed end, an open end and a sleeve chamber extending therebetween, the sleeve being mounted to the bicycle frame;
   a seat post having a seat end configured for receiving a seat thereon and an opposed engaging end adapted for engaging the sleeve chamber through the open end;
   a compartment mounted to the bicycle frame, the compartment being located adjacent to the closed end of the sleeve, the compartment having therein a compartment cavity in communication with a hollow lower portion of the bicycle frame, the compartment further having an access opening therein sized and shaped to allow access to the compartment cavity;
   a first stopping member mounted in the sleeve chamber; and
   a second stopping member associated with the seat post, the second stopping member being configured for cooperating with the first stopping member to allow slidable movement of the seat post along a restricted path of travel.

2. The seat anti-theft assembly as claimed in claim 1, wherein the first stopping member comprises a rod having a connecting end for connecting the rod to the closed end of the sleeve and a first stopping end located away from the connecting end.

3. The seat anti-theft assembly as claimed in claim 2, wherein the first stopping end comprises a first annular flange having a first flange surface for engaging the first stopping member.

4. The seat anti-theft assembly as claimed in claim 3, wherein the first flange surface faces towards the closed end of the sleeve.

5. The seat anti-theft assembly as claimed in claim 3, wherein the first flange surface comprises a planar surface.

6. The seat anti-theft assembly as claimed in claim 3, wherein the first annular flange is threadily mounted to the first stopping end of the rod.

7. The seat anti-theft assembly as claimed in claim 6, wherein the first stopping member comprises a stopping screw and the first annular flange comprises a screw head of the stopping screw, the stopping screw being mounted in a stopping screw receiving hole extending axially and inwardly in the rod from the first stopping end thereof.

8. The seat anti-theft assembly as claimed in claim 2, wherein the sleeve chamber has a sleeve chamber longitudinal axis, the rod being fastened to the closed end of the sleeve and extending therefrom towards the open end of the sleeve, the rod extending along the sleeve chamber longitudinal axis.

9. The seat anti-theft assembly as claimed in claim 3, wherein the seat post comprises a seat post chamber extending between the seat end and the second stopping member, the seat post chamber being sized and shaped to slidably receive therein the rod.

10. The seat anti-theft assembly as claimed in claim 9, wherein the second stopping member comprises a second annular flange having a second flange surface, the second annular flange defining a rod opening for slidably receiving therein the rod.

11. The seat anti-theft assembly as claimed in claim 10, wherein the second flange surface faces towards the open end of the sleeve.

12. The seat anti-theft assembly as claimed in claim 10, wherein the second flange surface is a planar surface.

13. A method for installing a seat anti-theft assembly on a bicycle frame, the method comprising:
    providing a sleeve having a closed end, an open end and a sleeve chamber extending therebetween, the sleeve being mountable to the bicycle frame;
    mounting the sleeve to the bicycle frame;
    providing a compartment having therein a compartment cavity, the compartment further having an access opening therein sized and shaped to allow access to the compartment cavity;
    mounting the compartment to the bicycle frame, adjacent to the closed end of the sleeve;
    providing a seat post having a seat end configured for receiving a seat thereon and an opposed engaging end;
    providing a first stopping member and a second stopping member;
    mounting the second stopping member to the seat post, proximal to the engaging end thereof;
    slidably inserting the seat post engaging end in the sleeve chamber through the open end of the sleeve;
    mounting the first stopping member in the sleeve chamber, the first stopping member being configured for collaborating with the second stopping member to allow slidable movement of the seat post along a restricted path of travel.

14. The method as claimed in claim 13, wherein the first stopping member comprises a rod having a connecting end and a first stopping end located away from the connecting end; further wherein the mounting of the first stopping member in the sleeve chamber further comprises connecting the connecting end to the closed end of the sleeve.

15. The method as claimed in claim 14, wherein the second stopping member comprises an annular flange defining a rod opening for slidably receiving therein the rod; further wherein the mounting of the first stopping member in the sleeve chamber further comprises slidably engaging the rod through the rod opening.

16. The method as claimed in claim 14, wherein the compartment further comprises a compartment sidewall defining the closed end of the sleeve, the compartment sidewall including a sidewall opening adapted to receive the connecting end of the rod therein; further wherein the mounting of the first stopping member in the sleeve chamber further comprises providing fastening means adapted for fastening the connecting end of the rod to the compartment sidewall, accessing the connecting end and the compartment sidewall through the access opening and fastening the connecting end of the compartment sidewall using the fastening means.

* * * * *